United States Patent [19]
Maynard et al.

[11] Patent Number: 5,161,303
[45] Date of Patent: Nov. 10, 1992

[54] CAPTIVE NUT INSERTION TOOL

[75] Inventors: Scott D. Maynard, Newport Beach; Mark H. Becker, Vista; Phillip L. Poynor, Irvine, all of Calif.

[73] Assignee: Robotics Automation Consulting Engineering Industries, Inc., La Mirada, Calif.

[21] Appl. No.: 724,535

[22] Filed: Jun. 28, 1991

[51] Int. Cl.$^5$ .............................................. B23P 19/00
[52] U.S. Cl. .................... 29/809; 29/243.5; 221/113; 221/312 A
[58] Field of Search ............... 29/809, 798, 243.5, 29/432, 525; 221/113, 312 A

[56] References Cited

U.S. PATENT DOCUMENTS

| | | | |
|---|---|---|---|
| 3,029,978 | 4/1962 | Gummere et al. | 221/113 |
| 3,137,932 | 6/1964 | Erdmann | 221/312 A |
| 4,574,473 | 3/1986 | Sawdon | 29/798 |
| 4,700,470 | 10/1987 | Muller | 29/809 |
| 4,785,529 | 11/1988 | Pamer et al. | 29/798 |
| 4,893,394 | 1/1990 | Muller | 29/809 |

Primary Examiner—P. W. Echols
Assistant Examiner—David P. Bryant
Attorney, Agent, or Firm—Hawes & Fischer

[57] ABSTRACT

An insertion tool to be interfaced with a turret-type punch press, or the like, to insert fasteners, such as captive or clinch nuts, into holes in a sheet metal workpiece. The tool includes a canister assembly having a plurality of guide rods on which the captive nuts are stacked. The nuts are loaded from the guide rods into respective holes in a rotatable planetary gear of the canister assembly so that successive ones of said nuts can be axially aligned with an exit opening of the canister assembly to be forcibly ejected therethrough by a punch assembly. The punch assembly and planetary gear are moved relative to the exit opening by a reciprocating cam enclosure which is connected to the punch assembly and to which an impact force is applied from the press. The reciprocating movement of the cam enclosure is transferred to the planetary gear to rotate said gear by way of a motion translating assembly including a rotatable cam that is coupled to and rotated by said cam enclosure.

25 Claims, 17 Drawing Sheets

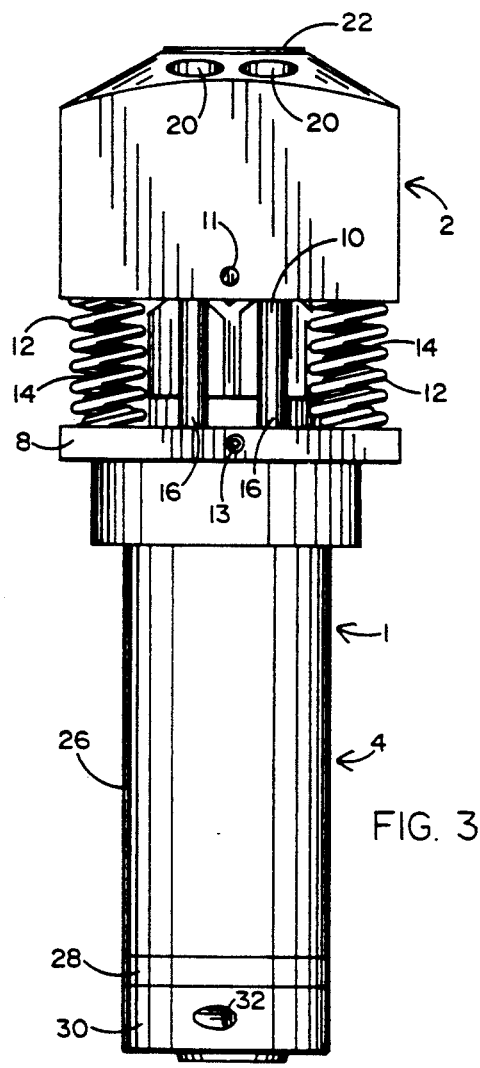
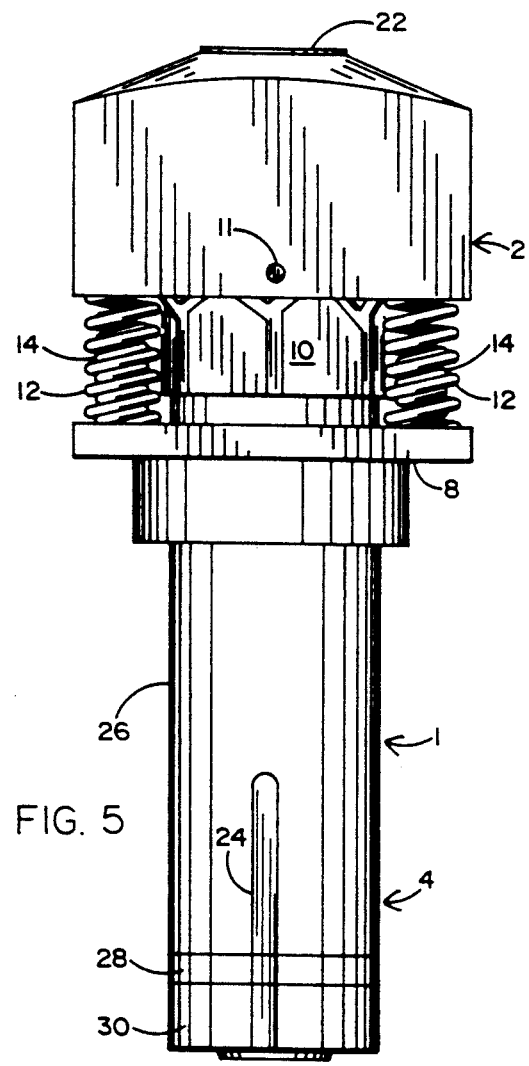
FIG. 3  FIG. 5
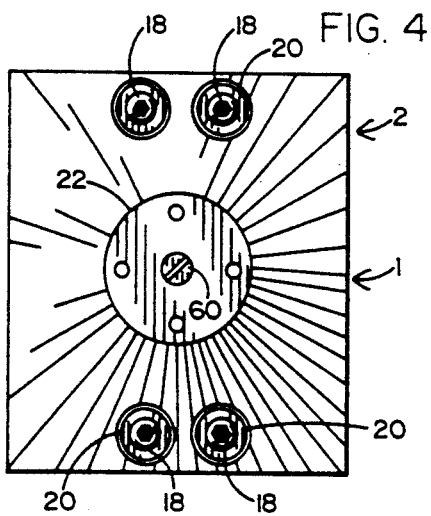
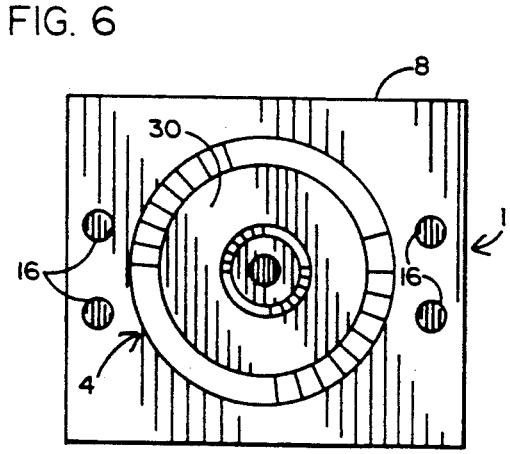
FIG. 4  FIG. 6

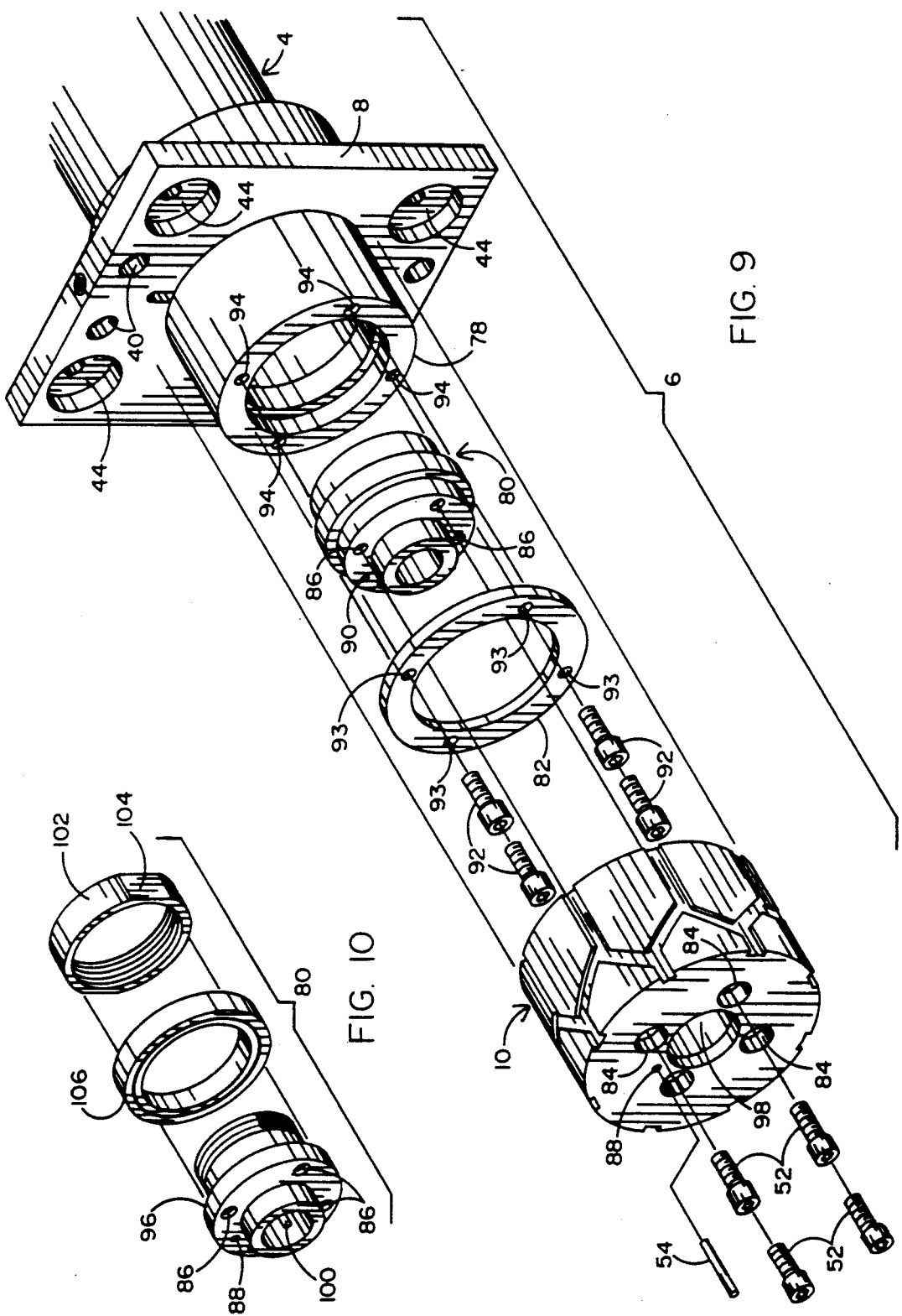

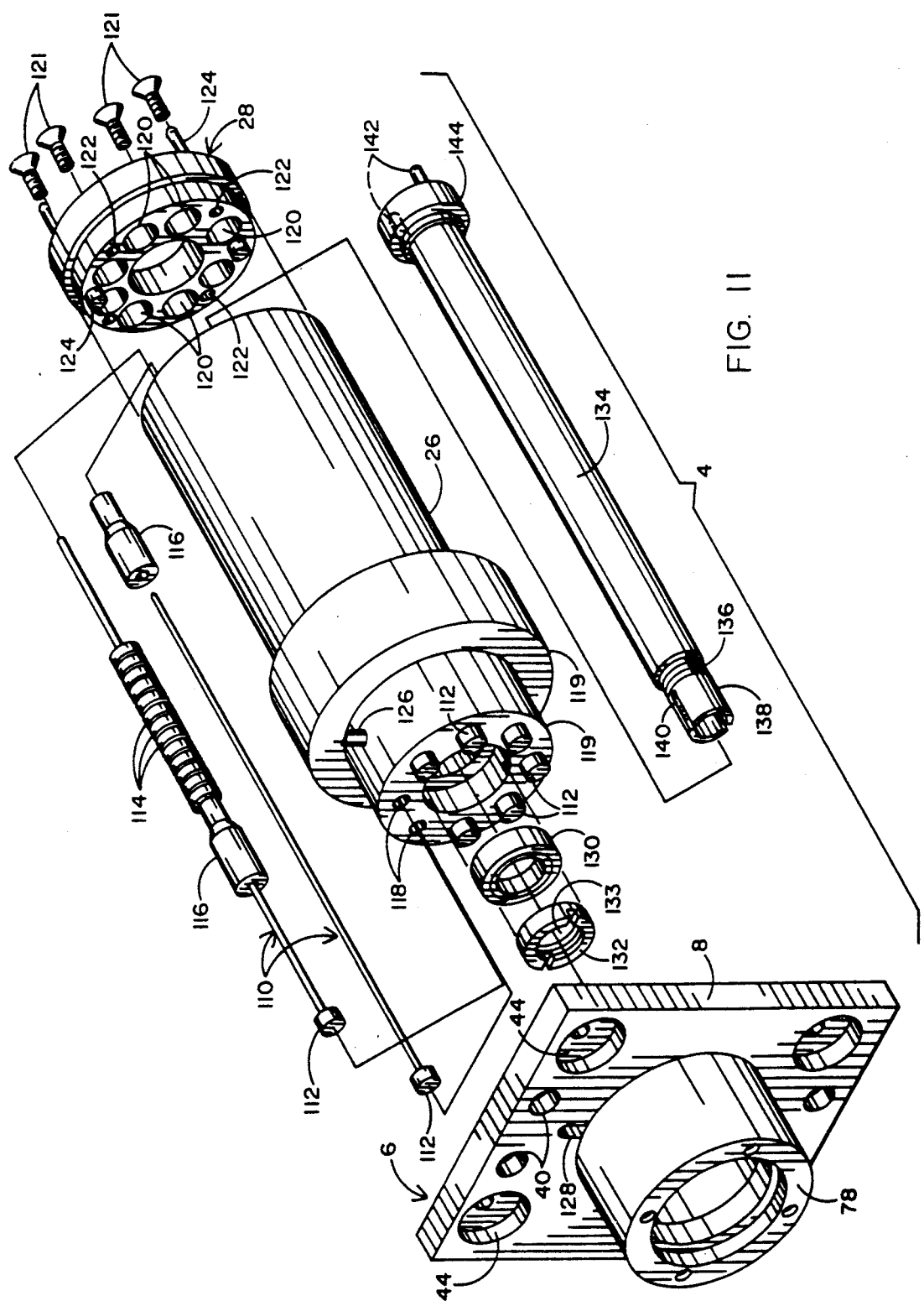

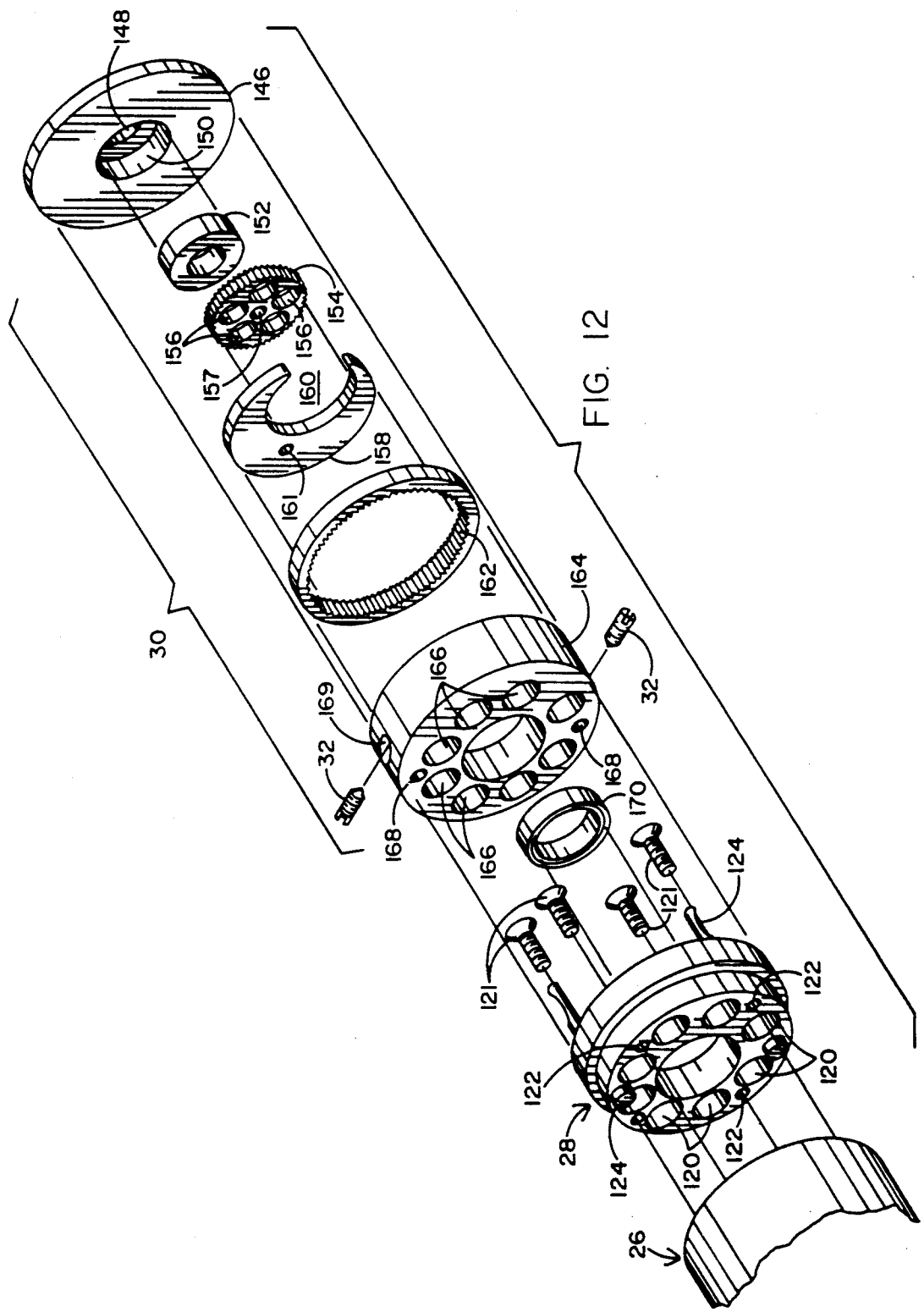

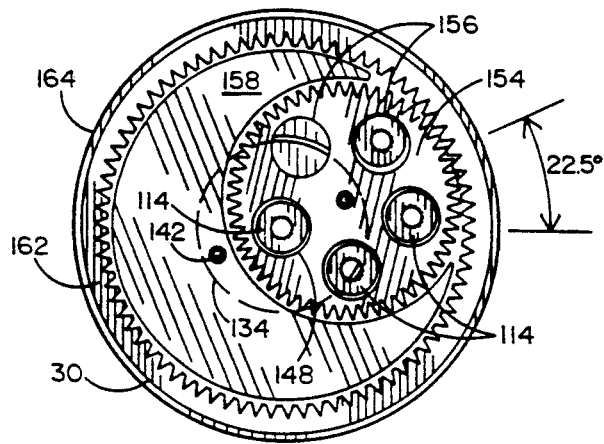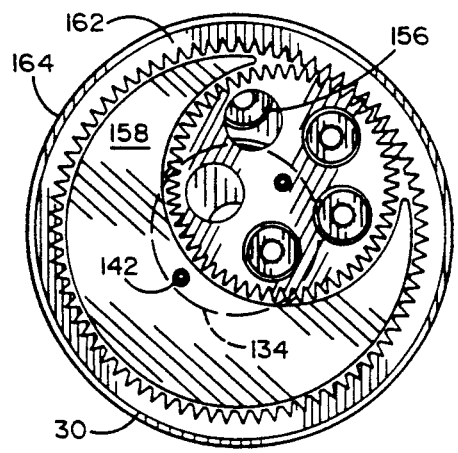
FIG. 25  FIG. 27
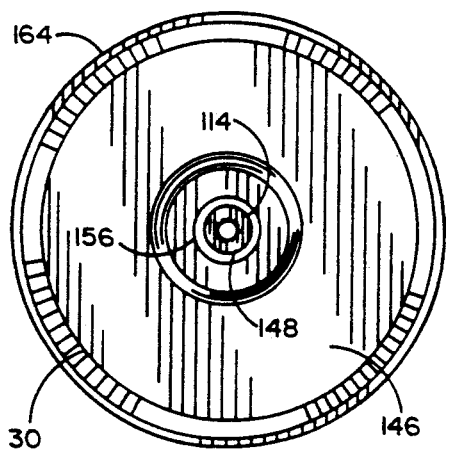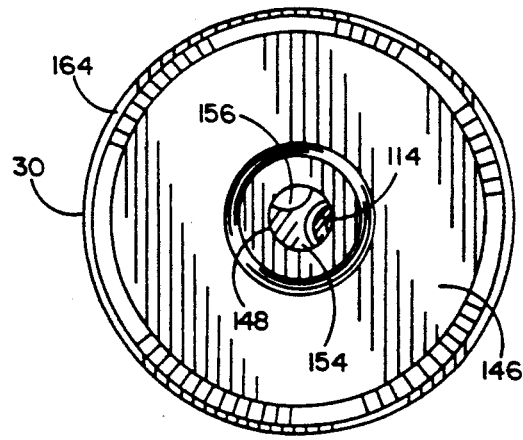
FIG. 26  FIG. 28

CAPTIVE NUT INSERTION TOOL

BACKGROUND OF THE INVENTION

1. Field of the Invention

This invention relates to an insertion tool to be interfaced with a turret-type punch press, or the like, and in which a plurality of captive or clinch nuts are stored and from which said nuts can be efficiently and automatically inserted into holes formed in a sheet metal workpiece.

2. Background Art

It is common in the sheet metal industry to pre-punch a series of holes into a workpiece, such as that used to form a chassis in the electronics industry. Well known fasteners, such as captive or clinch nuts, are then manually positioned, by a workman, in each of said holes. Next, the sheet is located below a suitable punch press, and the press is moved towards the workpiece to press said nuts, one at a time, into respective holes. With a nut feeder system, an operator can typically insert approximately 450 nuts within one hour of work.

However, the manual technique for inserting captive nuts into holes through a sheet metal workpiece is inherently inefficient. That is to say, the speed and reliability by which a workman can properly position and insert the nuts will vary with time. Moreover, if the workman incorrectly positions a nut in a hole, the punch which installs the nut could be damaged upon impact. Likewise, the nut may be misaligned with the axis of the hole when such nut is installed, making it difficult to insert a bolt therethrough. All of the foregoing contributes to waste, increased scrap and a correspondingly larger cost of assembly.

It would therefore be desirable to replace the conventional manual technique for installing captive nuts into a sheet metal workpiece so as to increase the speed, accuracy and consistency of such installation while reducing the cost and waste associated therewith. To this end, it would be desirable to accomplish the foregoing by means of an insertion tool in which a large supply of captive nuts can be easily stored and from which said nuts can be expelled, one at a time, and at a high speed, for reliable installation into the workpiece. It would be further desirable that the insertion tool be interfaced with a conventional punch press so that the operation of installing the nuts can be fully and efficiently automated.

BRIEF SUMMARY OF THE INVENTION

In general terms, a captive nut insertion tool is disclosed in which is stored a supply of conventional captive or clinch nuts and from which said nuts are forcibly expelled, one at a time, into holes formed in a sheet metal workpiece. The insertion tool is interfaced with a conventional turret-type punch press, or the like, so that the captive nuts can be installed with increased speed, efficiency and reliability. That is, during each successive operating cycle of the insertion tool, the punch press first moves the tool downwardly over the hole and then applies an impact force for driving a nut out of the tool and into said hole.

More particularly, the insertion tool comprises the interconnection of a cam enclosure, a flanged bearing housing and a canister assembly. The cam enclosure is adapted for reciprocal movement relative to the flanged bearing housing. A set of return springs is located between the cam enclosure and the flanged bearing housing to space said cam enclosure, in the at rest condition of the insertion tool, above said bearing housing. An impact force is applied from the punch press to the cam enclosure to drive the enclosure, during the dynamic condition of the insertion tool and against the normal bias of the return springs, towards the flanged bearing housing. A punch assembly is connected to and travels with the cam enclosure, such that a movement of said cam enclosure causes a corresponding movement of the punch assembly through the canister assembly to forcibly eject a captive nut therefrom and into a hole in the workpiece.

The flanged bearing housing of the insertion tool includes a support member extending therefrom upon which a cylindrical cam is supported for rotation. The cam has a unique guide track system extending continuously around the outer periphery thereof. A series of cam follower pins project radially from the cam enclosure for receipt by and travel through the guide track system of the cam. The reciprocal movement of the cam enclosure causes the cam follower pins to ride through such guide track system for imparting a rotation to the cam. The cam is interfaced with the cam support member of the flanged bearing housing by means of a hollow cam hub assembly, such that a rotation of the cam causes a corresponding rotation of said hub assembly. The cam hub assembly receives an elongated rotatable spindle therethrough, such that the rotation of said cam hub assembly is transferred to the spindle.

The canister assembly of the insertion tool includes a cylindrical canister body having a series of axially extending, parallel aligned guide chambers extending therethrough. Each guide chamber receives a guide rod on which a plurality of captive nuts are stacked. The canister assembly also includes a planetary gear cassette interconnected with the canister body and having a rotatable planetary gear. The planetary gear is interconnected with the rotatable spindle, such that the rotation of the spindle is transferred to said planetary gear. The planetary gear has a circular pattern of nut receiving clearance holes spaced therearound within which respective captive nuts are loaded, under the influence of gravity, from the nut carrying guide rods. During the rotation of the planetary gear, successive ones of the clearance holes in which a captive nut is located will be aligned with an exit opening through an end cap of the planetary gear cassette. Accordingly, when the punch assembly is moved through the canister assembly (corresponding to the downstroke of the cam enclosure and the dynamic condition of the insertion tool), the captive nut will be forcibly ejected through said exit opening for insertion into the hole of the workpiece.

BRIEF DESCRIPTION OF THE DRAWINGS

FIG. 3 is a side view of the insertion tool;

FIG. 4 is a top view of the insertion tool;

FIG. 5 is a front view of the insertion tool;

FIG. 6 is a bottom view of the insertion tool;

FIG. 9 is an exploded view illustrating the flanged bearing housing of the insertion tool;

FIG. 10 is an exploded view showing the details of a cam hub assembly which is interconnected with the flanged bearing housing of FIG. 9;

FIG. 11 is an exploded view of a canister assembly which forms the insertion tool and is detachably connected to the flanged bearing housing of FIG. 9;

FIG. 12 is an exploded view showing the details of a planetary gear cassette which forms the canister assembly of FIG. 11;

FIGS. 23-28 show details of the planetary gear cassette which forms the canister assembly and the means by which captive nuts are successively positioned to be forcibly ejected outwardly from said planetary gear cassette and into the hole formed in a workpiece;

DETAILED DESCRIPTION

Figure 1:
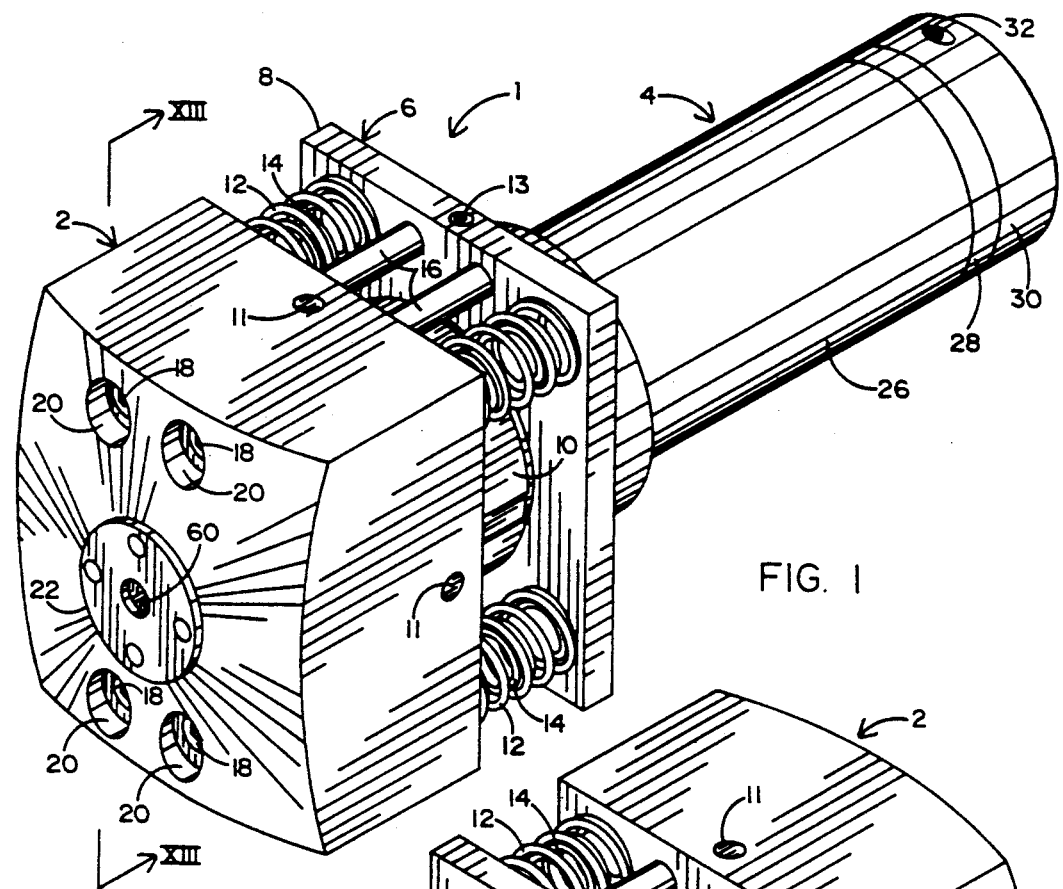
FIGS. 1 and 2 show perspective views of the captive nut insertion tool which forms the present invention.
Figure 2:
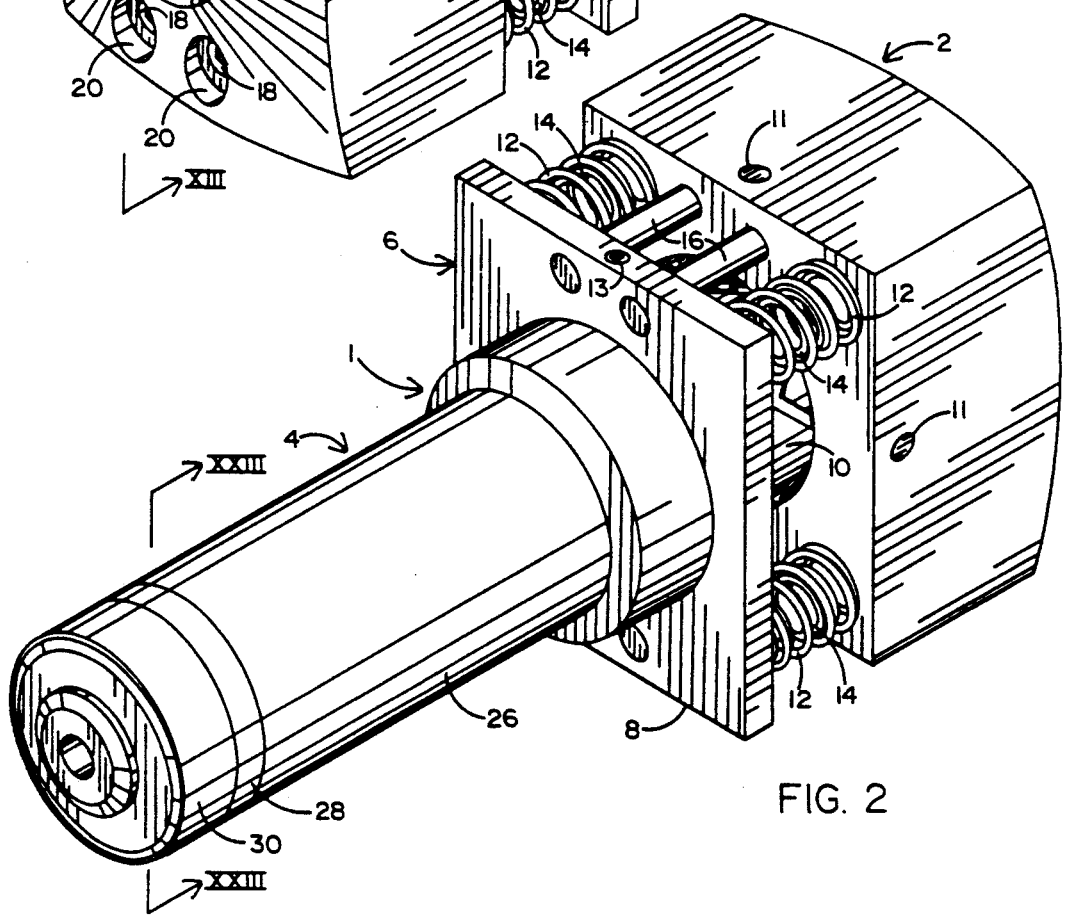

The captive nut insertion tool 1 which forms the present invention is initially disclosed while referring concurrently to FIGS. 1-6 of the drawings, where insertion tool 1 is shown in the at rest condition with no force being applied thereto. Insertion tool 1 includes a hollow, tapered (i.e. ramped) cam enclosure 2 at the top (best shown in FIGS. 13-16) and a cylindrical canister assembly 4 at the bottom. Located intermediate the cam enclosure 2 and canister assembly 4 is a flanged bearing housing 6 (best described while referring to FIGS. 7, 9 and 11). Briefly, however, the flanged bearing housing 6 includes a plate-like flange 8 which opposes cam enclosure 2 and supports a rotatable cylindrical cam 10 having a particular guide track system (best shown and described at FIGS. 17-22). A cam follower pin 11 extends radially through each side of cam enclosure 2 for receipt by and travel through the guide track system of cam 10 for causing said cam to rotate as cam enclosure 2 reciprocates relative to bearing housing 6 in a manner that will be described in greater detail hereinafter. A pair of sets screws 13 extend laterally through opposite sides of the flange 8 of bearing housing 6 to engage pins (designated 126 in FIG. 11) of the canister assembly 4 for detachably connecting canister assembly 4 to housing 6.

During the at rest condition of insertion tool 1, the flange 8 of bearing housing 6 is spaced from the cam enclosure 2 by a return spring assembly comprising four sets of concentrically aligned coil springs. More particularly, each set of springs includes an outer return spring 12 which surrounds one or more inner return springs 14, the functions of which will also be described in greater detail hereinafter. Extending from cam enclosure 2 for receipt by the flange 8 of bearing housing 6 are two pairs of parallel aligned guide rods 16. More particularly, a first end of a guide rod 16 is retained within a respective guide rod relief hole 20 at the top of cam enclosure 2. The opposite end of guide rod 16 is received (i.e. press fit) within a respective guide rod receiving hole (designated 40 and best shown in FIG. 7) located in flange 8.

Located at the top of cam enclosure 2 is a lock nut 22. As will be described in greater detail when referring to FIG. 8, the lock nut 22 is mated to a punch assembly 60 which extends longitudinally through insertion tool 1. Tool 1 is coupled to a turret-type punch press (not shown), such that the lock nut 22 is aligned to receive the impact of a longitudinally directed force which is transferred to punch assembly 60. To this end, the front of canister 4 is provided with an axially extending keyway 24 (at FIG. 5) by which to interface with the punch press and thereby prevent insertion tool 1 from rotating relative to the press due to torque and vibrations transmitted thereto.

As will be described in greater detail when referring to FIGS. 11 and 12, the canister assembly 4 includes the detachable arrangement of a canister body 26, a canister end cap 28 and a planetary gear cassette 30 which function to store and position captive nuts relative to the punch assembly 60 for insertion into a sheet metal workpiece. A pair of set screws 32 (best shown in FIG. 12) project through opposite sides of the planetary gear cassette 30 to adapt cassette 30 to withstand vibration and thereby avoid an unintended disassembly of canister assembly 4.

Figure 7:
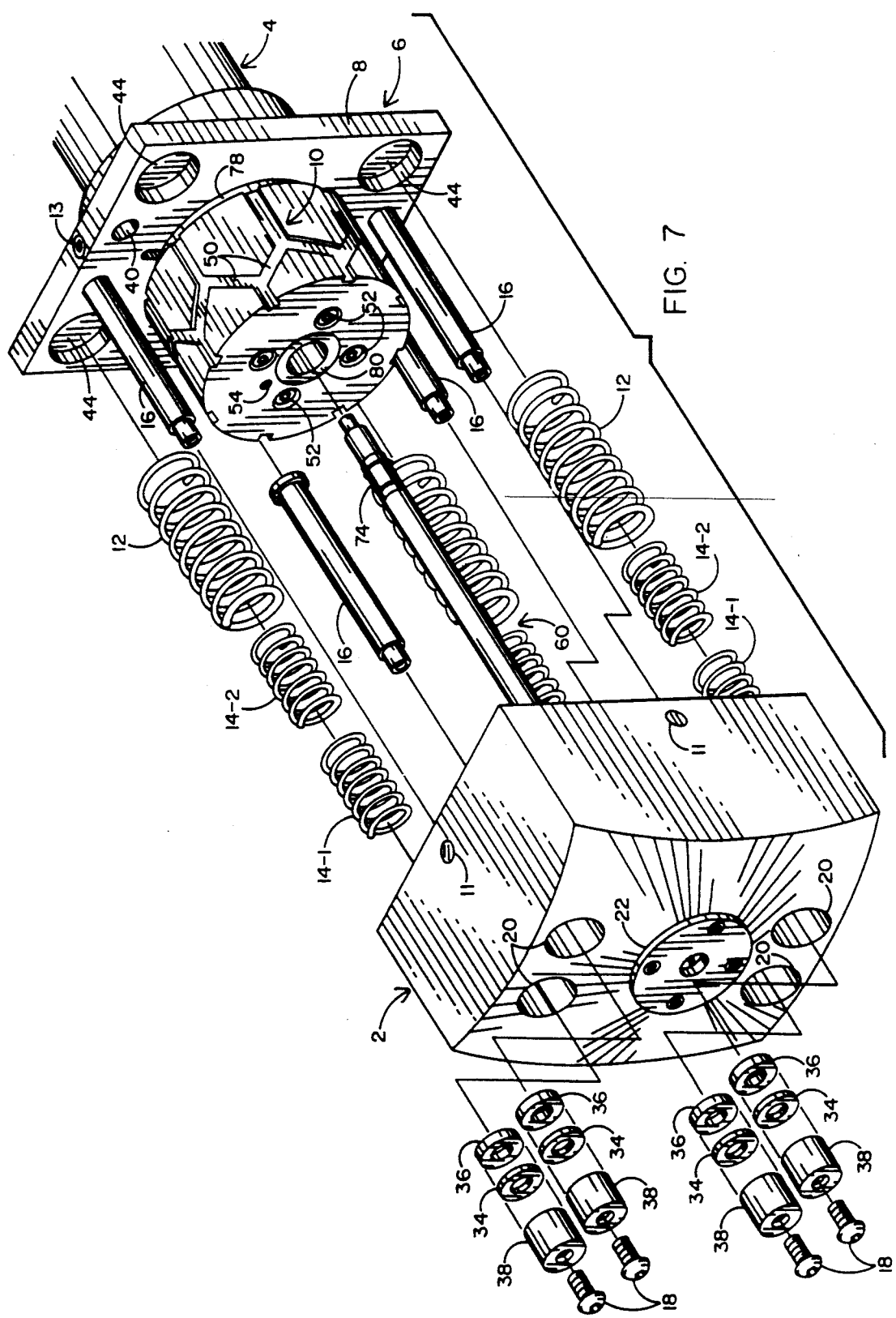
FIG. 7 is an exploded view illustrating the interconnection of a reciprocating cam enclosure with a flanged bearing housing which forms the insertion tool.

Referring now to FIG. 7 of the drawings, details are provided regarding the means for interconnecting the hollow cam enclosure 2 with flanged bearing housing 6, such that the cam enclosure 2 is adapted for reciprocal movement relative to the flange 8 of bearing housing 6 for correspondingly controlling the rotation of cam 10 and the axial movement of punch assembly 60. As earlier described, two pairs of parallel aligned guide rods 16 extend between the cam enclosure 2 and the flange 8 of bearing housing 6. More particularly, a first end of each guide rod 16 is pushed through a receiving hole 40 in flange 8 to be received within a guide rod relief hole 20 which extends longitudinally through cam enclosure 2. The first end of guide rod 16 is threaded to receive therein a guide rod retaining screw 18. Moreover, a pair of disk-shaped washers 34 and 36 and a cylindrical guide rod head 38 are attached to the first end of guide rod 16 by retaining screw 18 so as to prevent such first end from being pulled downwardly and outwardly from its relief hole 20. The first of the pair of washers 34 is preferably made from metal (e.g. steel), and the second washer 36 is preferably made from a non-metal (e.g. urethane) that can absorb the shock resulting from the return of the cam enclosure 2 to the at rest condition. The opposite end of each guide rod 16 is headed and positioned within the receiving hole 40 through the flange 8 of bearing assembly 6.

FIG. 7 also shows the return spring assembly comprising four sets of outer and inner coil springs 12 and 14 which extend between cam enclosure 2 and flange bearing housing 6 to provide sufficient pressure to return cam enclosure 2 to its at rest position of FIGS. 1-6 after an impact force, that is applied at lock nut 22 to drive said cam enclosure towards bearing housing 6, is terminated. As was earlier disclosed, each set of return springs includes the concentric alignment of an outer spring 12 which surrounds one or more inner springs 14. In the embodiment shown, a pair of oppositely wound inner springs 14-1 and 14-2 are stacked, one atop the other, although a single inner return spring may also be used. First ends of each set of return springs 12 and 14 are received within a relatively deep spring pocket (designated 42 in FIG. 14) which extends longitudinally into cam enclosure 2. The opposite ends of each set of return springs 12 and 14 are received within a relatively shallow spring pocket 44 formed within the flange 8 of bearing housing 6.

Supported for rotation relative to flange 8 is the cylindrical cam 10 having a particularly shaped cam follower guide track system 50 extending around the periphery thereof. In general terms, the cam 10 is a cylindrical body having an open top and a closed bottom, except for a sleeve opening therethrough (designated 98 and best shown in FIG. 9). As earlier disclosed, and in the assembled relationship of FIGS. 1-6, cam follower pins 11 extend radially through the sides of cam enclosure 2 for receipt by and travel through the guide track system 50 so as to induce the rotation of cam 10 as cam enclosure 2 reciprocates towards and away from flange 8 of bearing housing 6 in response to the application of successive impact forces at the lock nut 22. The details for rotatably supporting cam 10 from the flange 8 of bearing housing 6 will be described when referring to FIG. 9. Briefly, however, a plurality of (e.g. four) socket head cap screws 52 extend longitudinally through holes in the cam 10 to locate the cam upon a rotatable cam hub assembly (designated 80 and best shown in FIGS. 9 and 10). To this end, a dowel locating pin 54 extends longitudinally through cam 10 to position said cam at said cam bearing assembly 80 in proper alignment with cam follower pins 11.

Figure 8:
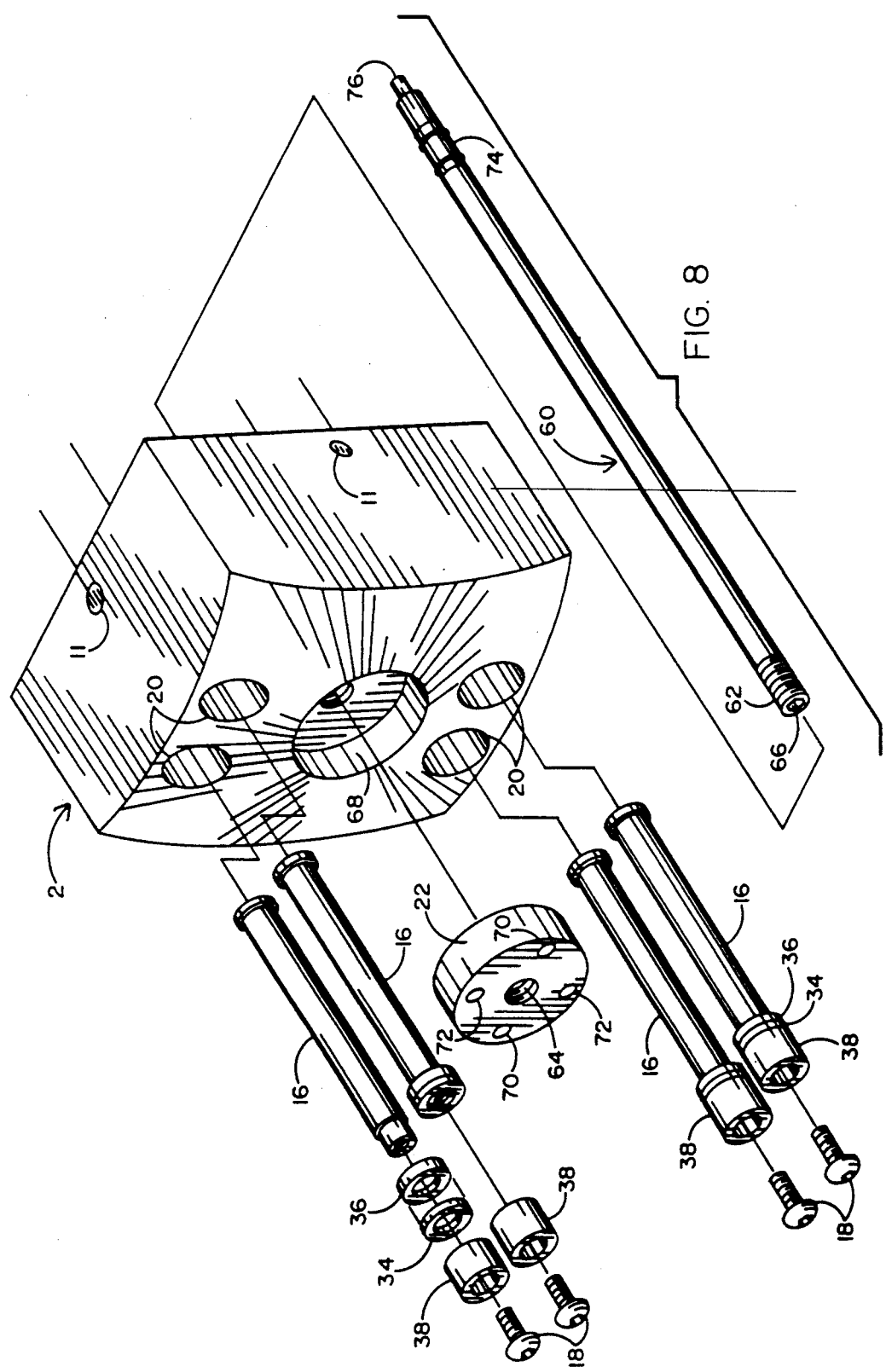
FIG. 8 is an exploded view illustrating the interconnection of the cam enclosure of FIG. 7 with a punch assembly.

Referring concurrently to FIGS. 7 and 8 of the drawings, the punch assembly 60 is shown extending at a first end thereof from the lock nut 22 of cam enclosure 2 into the canister assembly 4 via the sleeve opening of cam 10. More particularly, punch assembly 60 comprises a longitudinally extending rod having a threaded first end 62 which is mated to a hole (not shown) in the cam enclosure 2 and then to a correspondingly threaded hole 64 in lock nut 22 (best shown in FIG. 8). A socket 66 is formed in the threaded end 62 of punch assembly 60 (also best shown in FIG. 8) to receive a suitable tool (e.g. an Allen wrench) via the hole 64 in lock nut 22 for the purpose of adjusting the axial position of punch assembly 60 relative to canister assembly 4, depending upon the size of the captive nuts or the thickness of the sheet metal workpiece into which such captive nuts are to be inserted.

The lock nut 22 is received within a lock nut cavity 68 that is formed within the top of cam enclosure 2. A plurality of (e.g. four) holes are formed through lock nut 22. A first pair of holes 70 are sized to receive set screws (not shown) for tightening lock nut 22 to cam enclosure 2 within cavity 68. A second pair of such holes 72 are sized to received an appropriate tool (e.g. a spanner wrench) for the purpose of adjusting the position of and further tightening lock nut 22 within lock nut cavity 68.

Punch assembly 60 includes a punch tip 74 opposite the threaded first end 62 thereof. Punch tip 74 is preferably manufactured from heat treated tool steel. Extending axially from punch tip 74 is a relatively narrow punch 76 which is sized to correspond with the size of the captive nuts that are to be forcibly ejected from the canister assembly 4 for receipt in a sheet metal workpiece in a manner that will soon be described.

FIG. 9 of the drawings show the details of the flanged bearing housing 6 and the means by which the rotatable cam 10 is supported at the flange 8 thereof. Integral with and projecting upwardly from flange 8 is a hollow, cylindrical cam support housing 78. The diameter of housing 78 is slightly less than the diameter of the cam 10 so that, in the assembled relationship of FIGS. 1-6, cam 10 will be mounted upon and surround housing 78. Coaxially aligned with the cam 10 and housing 78 of flange bearing housing 6 are the cam hub assembly 80 (previously described when referring to FIG. 7) and a bearing retaining ring 82.

As was also previously described when referring to FIG. 7, socket head cap screws 52 extend through holes 84 in the cam 10 for receipt in correspondingly sized holes 86 in the cam hub assembly 80, such that the cam 10 and cam hub assembly 80 will rotate in unison. Likewise, the dowel locating pin 54 extends through a pinhole 88 drilled in cam 10 for receipt in a correspondingly sized hole 90 in cam hub assembly 80 to help prevent the rotation and misalignment of cam 10 relative to hub assembly 80.

Cam hub assembly 80 is received within and projects outwardly from the hollow interior of the cylindrical cam support housing 78 of flanged bearing housing 6. Hub assembly 80 is retained within support housing 78 by means of the bearing retaining ring 82 being located in surrounding engagement with bearing assembly 80 and positioned atop housing 78, such that a plurality of (e.g. four) socket head cap screws 92 extend through holes 93 formed in retaining ring 82 for receipt in correspondingly sized holes 94 in cylindrical housing 78 (also shown in FIG. 15).

Referring now to FIG. 10 of the drawings, the cam hub assembly 80 is shown in detail as comprising a hollow cam hub sleeve 96 through which a rotatable spindle (134 of FIG. 11) is received. In the assembled relationship (of FIG. 15), with cam hub assembly 80 retained within the cylindrical housing 78 of flanged bearing housing 6, a first end of cam hub sleeve 96 projects outwardly from housing 78 to be aligned for receipt with the sleeve opening (designated 98 in FIG. 9) through the otherwise closed end wall of cam 10. Projecting radially inward from this first end of sleeve 96 is a key 100, the function of which is to engage and drive a rotatable spindle (designated 134 and illustrated in FIG. 11). The second end of cam bearing sleeve 96 includes a series of threads so that sleeve 96 can be mated to a correspondingly threaded retaining nut 102 which fits around such second end. Retaining nut 102 may be provided with one or more flats 104 at which to receive a suitable tool (e.g. a wrench) to facilitate the mating of cam hub sleeve 96 to retaining nut 102. Also surrounding the second end of cam hub sleeve 96 behind the threads thereof is a ball bearing assembly 106 (best shown in FIG. 15). Ball bearing assembly 106 is retained between opposing surfaces of hub sleeve 96 and nut 102 when said sleeve and nut are mated together so as to permit the simultaneous rotation of the cam 10 and the sleeve 96 which is connected to said cam (by cap screws 52).

FIG. 11 of the drawings shows the canister assembly 4 in which is stored the captive nuts on a plurality of (e.g. eight) nut carrying guide rods 110 that are retained within the canister body 26. More particularly, each nut carrying guide rod 110 comprises an elongated body having an enlarged head 112 at one end. A plurality of captive nuts 114 (also sometimes known as clinch or PEM nuts) are stacked one above the other on each nut carrying guide rod 110. A metal (e.g. tungsten) weight 116 is also positioned on guide rod 110 between the head 112 and the stack of nuts 114 to oppose vibrations and force such nuts downwardly through the canister body 26 of canister assembly 4 under the influence of gravity.

Each guide rod 110 with the nuts 114 stacked thereon is retained in a guide chamber 118 which extends longitudinally through canister body 26 from a canister bearing housing 119, such that the enlarged heads 112 of nut carrying guide rods 110 are located and retained outside bearing housing 119. The guide chambers 118 are aligned parallel with each other and axially with respective exit holes 120 formed in the canister end cap 28 so that nuts 114 can be fed by gravity from successive nut carrying guide rods 110 to the planetary gear cassette (designated 30 in FIG. 12) as will soon be described. A plurality of (e.g. four) flat head screws 121 extend through screw holes 122 in canister end cap 28 for receipt at the bottom of canister body 26 to attach end cap 28 to canister assembly 4. To provide for proper alignment between the canister end cap 28 and the planetary gear cassette 30, a pair of grooved planetary gear cassette alignment pins 124 extend through holes in end cap 28 for receipt by gear cassette 30 (best shown in FIG. 12).

In the assembled relationship, with canister assembly 4 detachably connected to flanged bearing housing 6, one or more canister alignment pins 126 are removably received through alignment slots 128 formed in the flange 8. The upper end of the canister bearing housing 119 of canister assembly 4 is received in the cylindrical cam support housing 78 of flanged bearing housing 6 below the cam hub assembly 80 (best shown in FIG. 15). To this end, an upper spindle ball bearing 130 and a threaded retaining nut 132 are slip fit into housing 119 to receive and support a threaded end of the rotatable spindle 134 (also best shown in FIG. 15).

FIG. 11 also shows the spindle 134 which surrounds the punch assembly 60 and extends longitudinally through the canister body 26 of canister assembly 4. A first end of spindle 134 contains a threaded portion 136 which is mated to the threaded retaining nut 132 within the housing 119 of canister assembly 4. Retaining nut 132 has a slot 133 formed therein to receive a tool for tightening said nut to the threaded portion 136 of spindle 134. The first end of spindle 134 also includes a shank 138 which is coextensive to threaded portion 136. A keyway 140 is formed in shank 138 in which to receive the radially projecting key 100 of the cam hub sleeve 96 of cam hub assembly 80 (of FIG. 10). Thus, and as an important aspect of the present invention, the rotation of the cam hub assembly 80 with the cam 10 is transferred to spindle 134 at the interconnection of key 100 to keyway 140. Moreover, the rotation of spindle 134 is transferred to the planetary gear cassette (30 of FIG. 12) by virtue of a pair of spindle drive pins 142 which project from a spindle head 144 at the opposite end of spindle 134. In the assembled relationship of FIG. 13, the spindle 134 extends through an opening in the center of canister end cap 28 to interface with the planetary gear cassette 30 by means of spindle drive pins 142. A lower spindle ball bearing (designated 170 in FIG. 12) surrounds the opposite end of spindle 134 behind the spindle head 144 at a location within the central opening of end cap 28 to support said spindle (with upper spindle ball bearing 130) for rotation relative to end cap 28 and canister body 26.

FIG. 12 of the drawings shows the details of the planetary gear cassette 30 and the interconnection of cassette 30 to canister end cap 28 and to canister body 26 to complete the canister assembly 4. Planetary gear cassette 30 includes a nose cone 146 at the bottom thereof. Nose cone 146 includes an exit opening 148 through which captive nuts, stored within the canister body 26, are driven by the punch assembly. Surrounding exit opening 148 is a pocket 150 into which is positioned a ring-shaped urethane liner 152. Liner 152 provides an important advantage of preventing nuts from falling out through the exit opening 148 of nose cone 146, under the influence of gravity, prior to such nuts being forcibly driven through exit opening 148 by the punch assembly. This feature of preventing the premature departure of nuts from canister body 26 is particularly significant when the insertion tool of this invention is to be used with a low speed punch press.

Positioned above the exit opening 148 of nose cone 146 is a rotatable planetary gear 154. Planetary gear 154 has a series of teeth extending continuously around the outer periphery thereof. A plurality of (e.g. five) nut-receiving clearance holes 156 are evenly spaced in a circular pattern around gear 154 and sized to be slightly larger than the diameter of the captive nuts that are stacked upon the nut-carrying guide rods (110 in FIG. 11) which are carried within the canister body 26.

Positioned adjacent planetary gear 154 is a crescent-shaped disk 158. The crescent shape of disk 158 is defined by an opening 160 therein which is sized to receive the planetary gear 154. It is important to note that the crescent-shaped disk 158 is positioned relative to the nose cone 146 of planetary gear cassette 30 such that no more than one of the nut clearance holes 156 through the planetary gear 154 will be axially aligned with the exit opening 148 of nose cone 146 at any given time.

Figure 29:
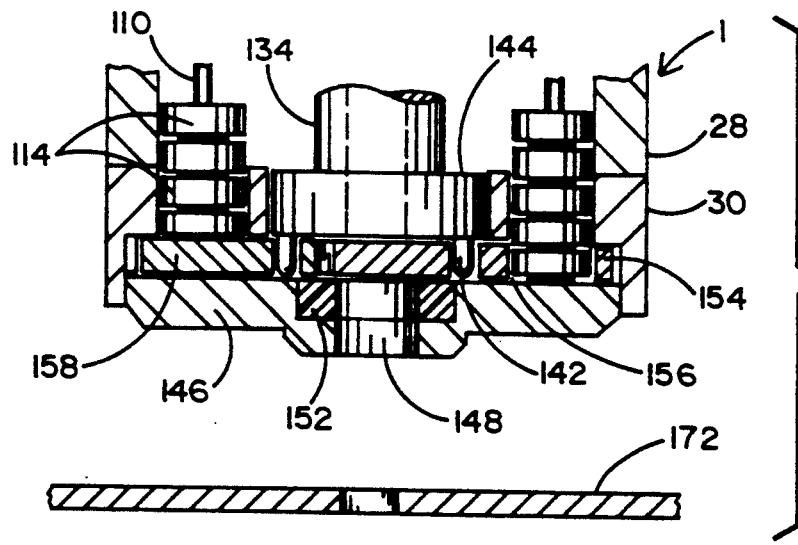
FIGS. 29-32 are partial cross-sections of the planetary gear cassette to illustrate the positioning of a captive nut so as to be forcibly ejected therefrom into a workpiece.

Drive pin ports 157 and 161 are formed in each of the planetary gear 154 and disk 158 for receipt of respective drive pins 142 of rotatable spindle 134 (of FIG. 11), such that a rotation of spindle 134 can be transferred to gear 154 and disk 158. A ring gear 162 surrounds the union of the planetary gear 154 and the crescent-shaped disk 158. Ring gear 162 includes a series of teeth extending continuously around the inner periphery thereof. As is best shown in FIGS. 27-29, the teeth of planetary gear 154 engage the teeth of the ring gear 162 at the opening 160 in disk 158 to permit planetary gear 154 to rotate within or inside ring gear 162 relative to nose cone 146, whereby to position successive ones of the nut-receiving clearance holes 156 of planetary gear 154 over the exit opening 148 of nose cone 146.

In the assembled relationship, a cylindrical gear housing 164 having a hollow interior is covered by the nose cone 146 to complete the planetary gear cassette 30. Nose cone 146 and ring gear 162 are press fit into and retained by friction within the gear housing 164. Gear housing 164 has a circular pattern of holes 166 extending therethrough which are axially aligned with the holes 120 through canister end cap 28. Each pair of axially aligned holes 120 and 166 from the end cap 28 and the gear housing 164 of planetary gear cassette 30 are oriented relative to one another to receive a respective nut-carrying guide rod 110 (best shown in FIG. 13). As was previously disclosed when referring to FIG. 11, the orientation of canister end cap 28 relative to planetary gear cassette 30 is preserved by means of the grooved planetary cassette alignment pins 124 which project outwardly from end cap 28 for receipt within respective pin openings 168 formed in gear housing 164. Set screws 32 (also shown in FIGS. 1 and 3) extend through openings 169 in the gear housing 164 to engage such grooved alignment pins 124 from end cap 28 to better enable the planetary gear cassette 30 to hold together and resist the effect of vibration. As was also previously disclosed when referring to FIG. 11, a lower spindle ball bearing 170 is received within the central opening of end cap 28 to surround and support one end of the spindle (designated 134 in FIG. 11) for rotation relative to said end cap.

Figure 13:
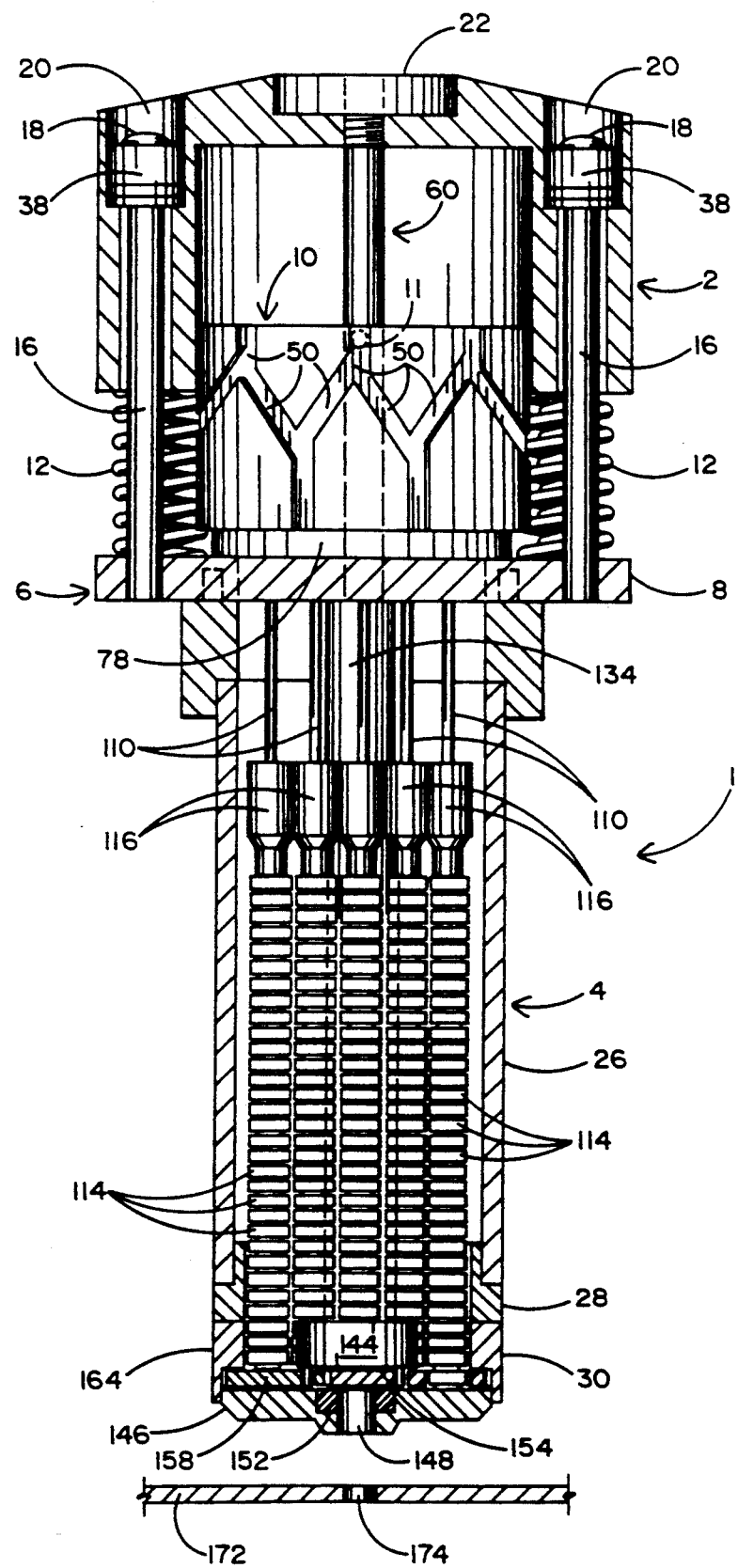
FIG. 13 is a cross-section of the insertion tool in its at rest condition with no impact force being applied thereto.
Figure 14:
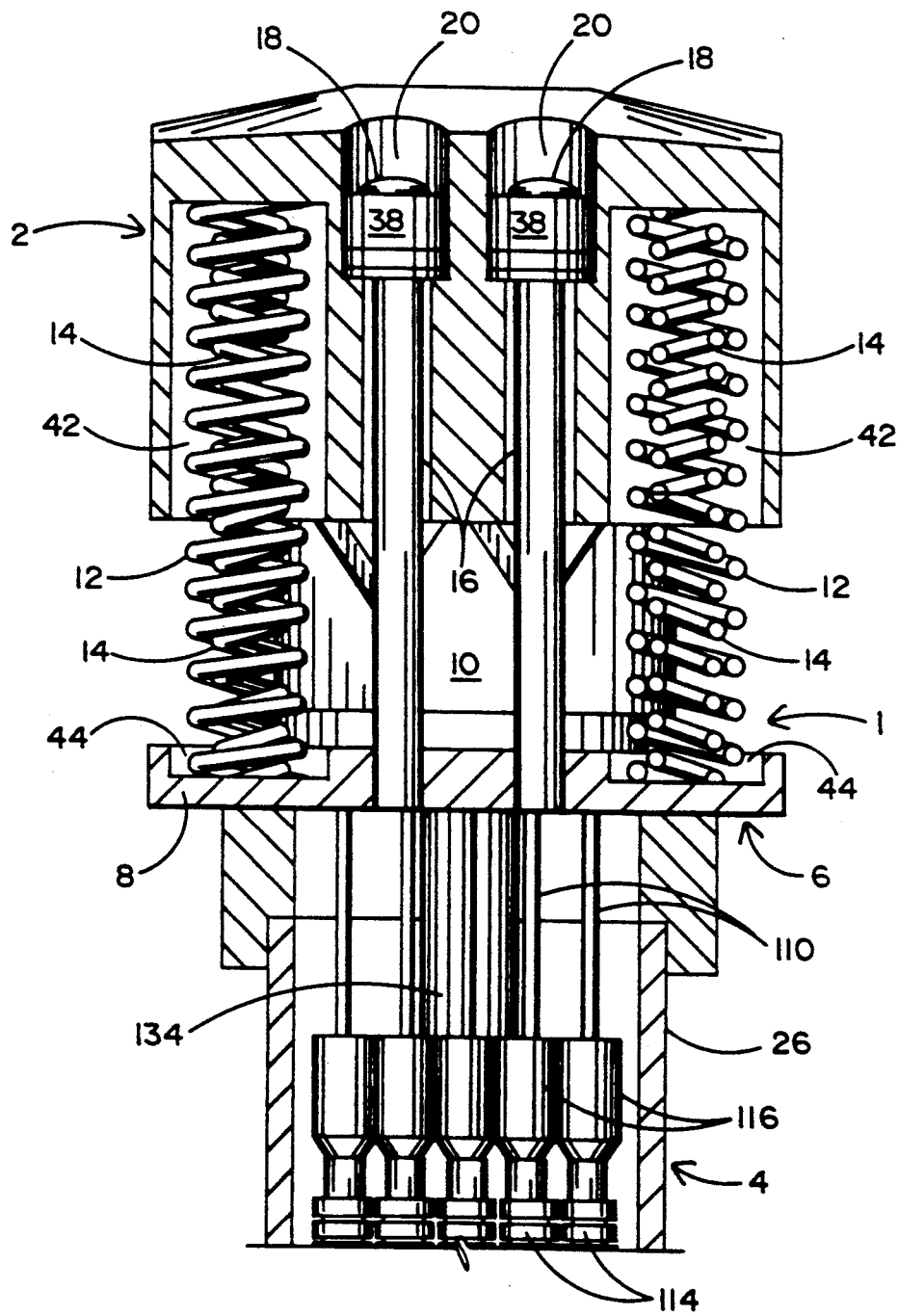
FIG. 14 is another cross-section of the insertion tool in the at rest condition to illustrate the location of a set of return springs between the reciprocating cam enclosure and the flanged bearing housing.
Figure 15:
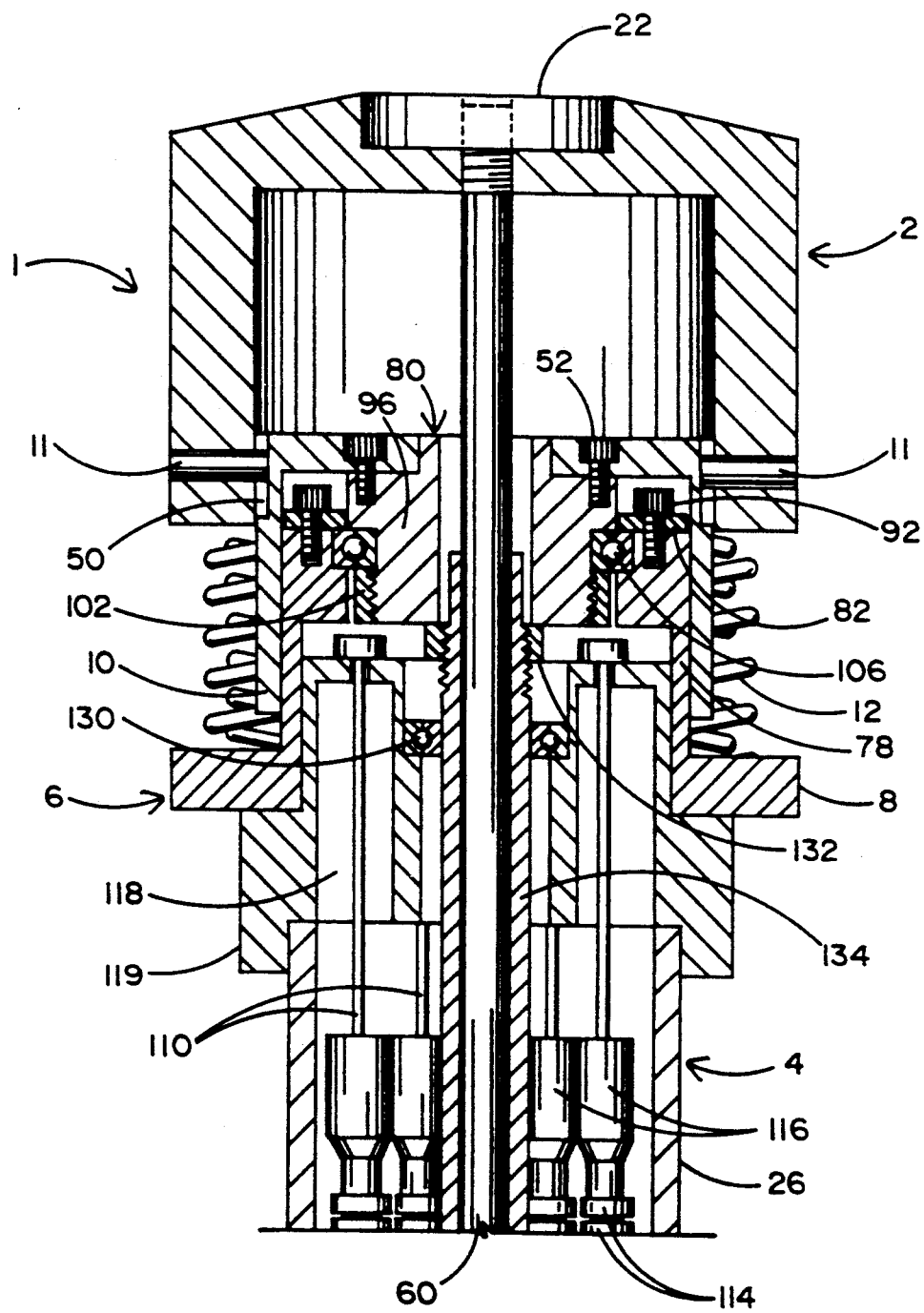
FIG. 15 is yet another cross-section of the insertion tool to illustrate the interconnection between the cam enclosure, the flanged bearing housing and the canister assembly.

Referring concurrently to FIGS. 13-15 of the drawings, the insertion tool 1 which forms the present invention is shown in the assembled, at rest condition, and positioned relative to a sheet metal workpiece 172 so that the captive nuts 114 that are stacked below weights 116 on nut-carrying guide rods 110 within guide chambers 118 of the canister body 26 of canister assembly 4 may be forcibly ejected by the punch assembly 60 through the exit opening 148 in the nose cone 146 of planetary gear cassette 30 for receipt within holes (e.g. 174) in the workpiece 172. More particularly, and is best shown in FIG. 14, the spring assemblies, comprising sets of outer and inner return springs 12 and 14, which extend between deep pockets 42 in cam enclosure 2 and shallow pockets 44 in the flange 8 of flanged bearing housing 6, are fully expanded to cause the hollow cam enclosure 2 to be spaced above flange 8 and cam 10. Accordingly, cam enclosure 2 is held by springs 12 and 14 against the heads 38 of guide rods 16, such that said heads 38 are seated within guide rod relief holes 20. In the at rest position, cam follower pins 11 (best shown in FIG. 15) project through the sides of cam enclosure 2 for receipt at the top of respective tracks of the cam follower guide track system 50 of cam 10.

As best shown in FIG. 13, the punch assembly 60 extends longitudinally from lock nut 22 of cam enclosure 2 through openings in the cam hub 80, spindle 134 and planetary gear cassette 30, so that the punch tip 74 is aligned with the exit opening 148 in the nose cone 146 of cassette 30. The rotatable spindle 134 surrounds punch assembly 60 and extends longitudinally through canister assembly 4 from the hub assembly 80 (of FIG. 10) within the cam support housing 78 of flanged bearing housing 6 to the planetary gear cassette 30, with the spindle drive pins 142, which project from the spindle head 144, received in respective drive pin ports (157 and 161 of FIG. 12) of the planetary gear 154 and crescent-shaped disk 158.

Figure 16:
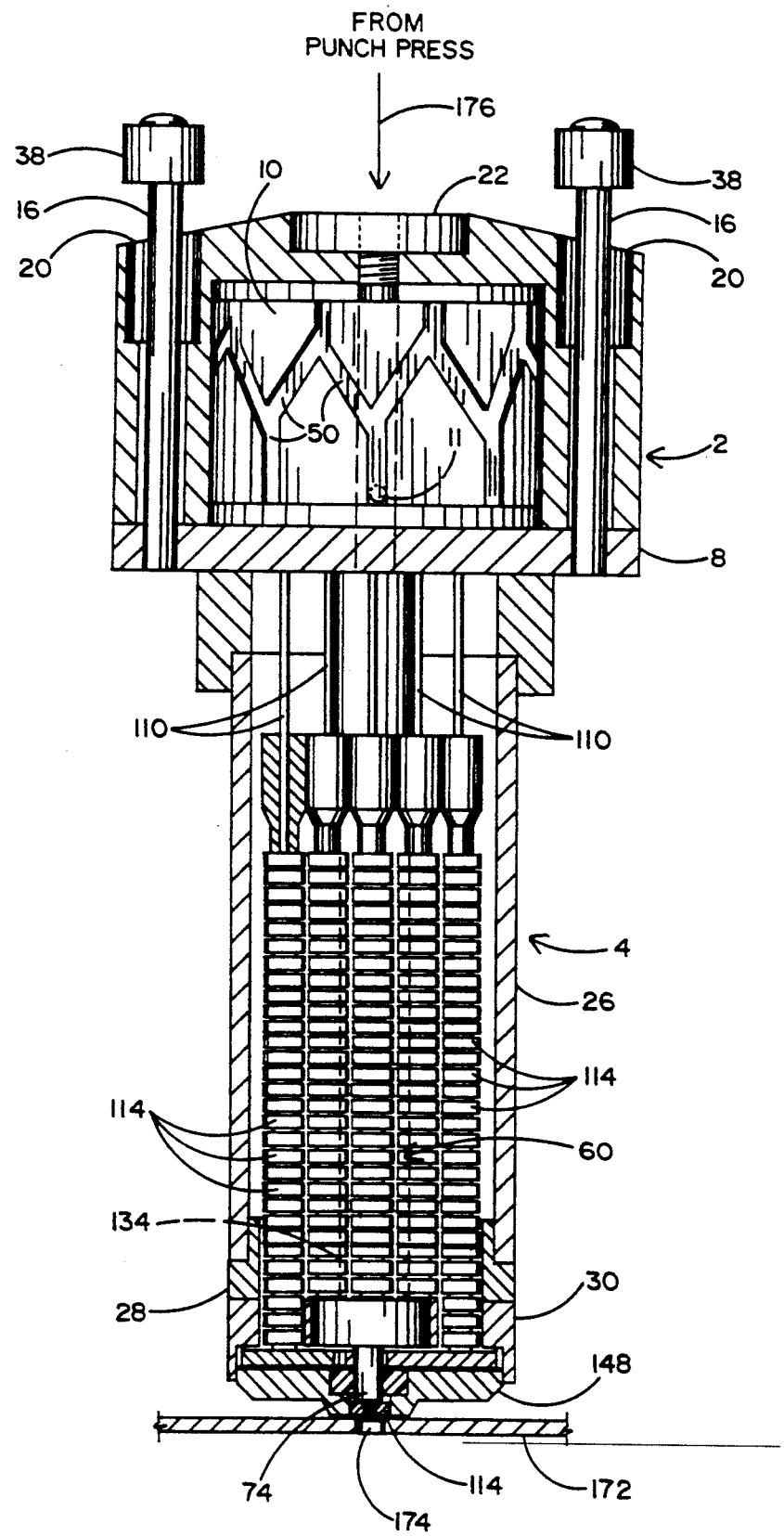
FIG. 16 is a cross-section of the insertion tool in the dynamic condition with an impact force being applied thereto.

In FIG. 16, a force (designated by reference arrow 176) is delivered by the punch press to the top of the reciprocating cam enclosure 2 at the lock nut 22 thereof to move insertion tool 1 out of its at rest condition and into the dynamic condition. More particularly, the cam enclosure 2 is driven downwardly along guide rods 16 towards the flange 8 of flange bearing assembly 6. Accordingly, the guide rod heads 38 are unseated from and project outwardly from guide rod relief holes 20 at the top of cam enclosure 2. The sets of outer and inner return springs (designated 12 and 14 in FIG. 14) are now compressed to store energy for returning the cam enclosure 2 upwardly during the upstroke of said cam enclosure 2. Moreover, the cam 10 is now surrounded by the hollow cam enclosure 2, and the cam follower pins 11 (only one of which being shown in FIG. 16) ride downwardly with the cam enclosure 2 through the guide track system 50 of cam 10 for causing said cam to rotate (in a clockwise direction). As will soon be detailed, this rotation of cam 10 is transferred to gear cassette 30 by means of spindle 134 to cause one of the captive nuts 114 from a guide rod 110 to be positioned below the punch tip 74 of punch assembly 60 in order to be forcibly ejected during the dynamic condition of tool 1 via the exit opening 148 in nose cone 146 and into the hole 174 of a sheet metal workpiece 172.

Referring at this point to FIGS. 17-22 of the drawings, the receipt and travel of the cam follower pins 11 in the guide track system 50 of cam 10 is now described for causing said cam to rotate whenever the reciprocating cam enclosure 2 of insertion tool 1 is first driven downwardly by an impact force delivered by the punch press and then upwardly by the action of return springs 12 and 14. The guide track system 50 includes eight identically-shaped branches which are interconnected with one another and extend continuously around the periphery of cam 10. As best described when referring to FIG. 17, each branch of guide track system 50 includes a vertical upper track section 180, a vertical lower track section 182, and left and right side intermediate track sections 183 and 184, which sections are angled relative to upper and lower track sections 180 and 182. First ends of the intermediate track sections 183 and 184 intersect one another at a common junction formed with upper track section 180. The second end of left side intermediate track section 183 communicates with the preceding branch of track system 50, while the second end of right side intermediate track section 184 communicates with lower track section 182. Each section of guide track system 50 comprises a groove or channel that is formed in cam 10 and sized to receive the cam follower pins 11. A total of four cam follower pins 11 are located in alternate ones of the eight branches which form track system 50.

Figure 17:
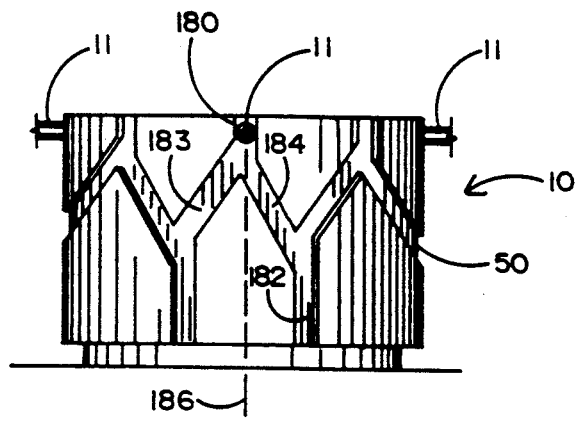
FIGS. 17-22 illustrate the guide track system of a cam which is supported for rotation from the flanged bearing housing and the means by which said cam is rotated relative to said bearing housing.
Figure 19:
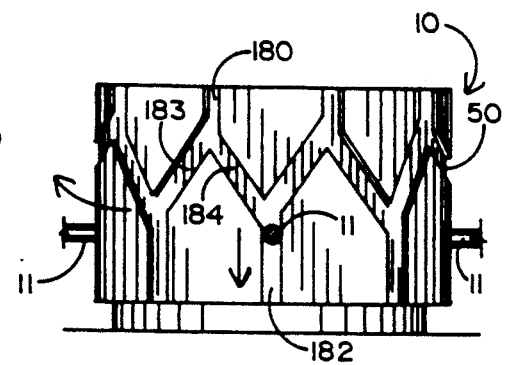
Figure 18:
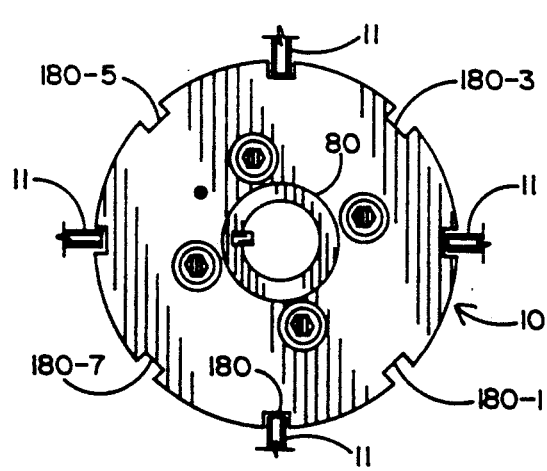
Figure 20:
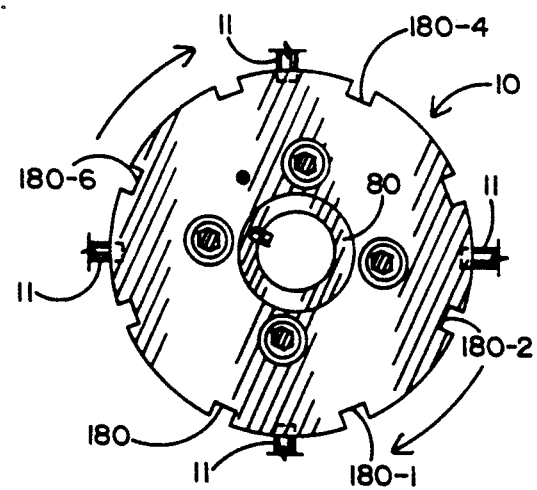

As demonstrated by a vertically extending reference line 186 in FIG. 17, the upper track section 180 is slightly offset relative to the intersection of the intermediate track sections 183 and 184. By virtue of the foregoing and at the beginning of the downstroke of the cam enclosure 2, a pin 11, which travels with the cam enclosure, rides downwardly through upper track section 80 until pin strikes a side wall which defines the right side intermediate track section 184. During the remainder of the downstroke of the cam enclosure, the pin 11 continues to ride downwardly through intermediate track section 184 for receipt by lower track section 182 (best shown in FIG. 19). However, the downward force created by cam follower pin 11 striking the angled intermediate track section 184 during the downstroke of the cam enclosure imparts a corresponding clockwise rotation to cam 10. That is, cam 10 rotates through an arc of 22.5 degrees as pin 11 travels downwardly from upper track section 180 to lower track section 182.

Figure 21:
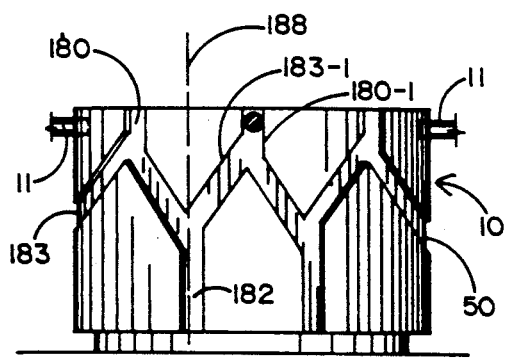

At the end of the downstroke of cam enclosure 2 (shown at FIG. 16), the impact force applied thereto by the punch press is temporarily terminated. Accordingly, the return springs (12 and 14) which were formerly compressed during the downstroke, begin to expand for driving the cam enclosure and the cam follower pins 11 upwardly and back towards their at rest position shown at FIGS. 13–15). As best shown in FIG. 21, a first end of the lower track section 182 intersects the second ends of the right side intermediate track section 184, just described, and a left side intermediate track section 183-1 from a succeeding branch of guide track system 50. As demonstrated by a vertically extending reference line 188, the lower track section 182 is slightly offset relative to the intersection of the intermediate track sections 184 and 183-1. Thus, at the beginning of the upstroke of the cam enclosure 2, pin 11 rides upwardly through lower track section 182 until said pin strikes a sidewall which defines intermediate track section 183-1. During the remainder of the upstroke, the pin 11 continues to ride upwardly through intermediate track section 182 for eventual receipt at the upper track section 180-1 of the succeeding track branch. However, the upward force created by cam follower pin 11 striking the angled intermediate track section 183-1 during the upstroke of the cam enclosure imparts a further clockwise rotation to cam 10, such that cam 10 rotates through an additional arc of 22.5 degrees.

To this end, it should be apparent that during each full stroke cycle of the reciprocating cam enclosure 2, with a cam follower pin 11 traveling through track system 50 from the upper track section 180 of a first track branch to the upper track section 180-1 of a succeeding track branch, the cam rotates through an arc of 45 degrees. Therefore, cam enclosure 2 must complete a total of eight stroke cycles to produce one complete rotation of cam 10.

The positions of planetary gear 154 of the planetary gear cassette 30 and the nut receiving clearance holes 156 thereof relative to the exit opening 148 through the nose cone 146 of cassette 30 are shown in FIGS. 23–28 of the drawings for one complete cycle of the reciprocating cam enclosure (not shown) with the insertion tool of this invention positioned relative to a sheet metal workpiece during each of the at rest and dynamic conditions thereof. More particularly, in FIGS. 23 and 24, the planetary gear 154 is shown during the time that the insertion tool is at rest, such that no force is being applied to the cam enclosure, whereby the cam enclosure is at the top of its upstroke and the cam follower pins 11 are correspondingly positioned in respective upper tracks (180, 180-2, 180-4, and 180-6 of FIGS. 17 and 18) in each of the branches of guide track system 50 of cam 10. As was previously disclosed when referring to FIGS. 11 and 12, the drive pins 142 of the rotatable spindle 134 are received within respective drive pin ports 157 and 161 of the planetary gear 154 and crescent-shaped disc 158. Thus, the rotation imparted to spindle 134 from cam hub assembly 80 (of FIGS. 9 and 10) is further imparted to gear 154 and disc 158 of planetary gear cassette 30 to cause the toothed planetary gear 154 to rotate around the inner periphery of the toothed ring gear 162.

In the at rest position of the insertion tool, the planetary gear 154 is particularly located relative to ring gear 162, whereby none of the nut receiving clearance holes 156 in gear 154 is axially aligned with the exit opening 148 through nose cone 146. Thus, in the at rest condition of FIGS. 23 and 24, the planetary gear cassette 30 is spaced above the metal workpiece 172 (best shown in FIG. 29) and none of the captive nuts 114 located in clearance holes 146 is capable of either falling out from or being forcibly ejected through exit opening 148 by means of the punch assembly 60 (of FIG. 29).

Figure 23:
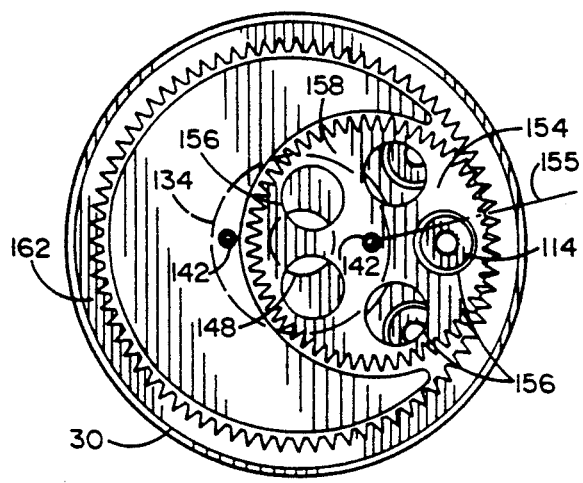
Figure 22:
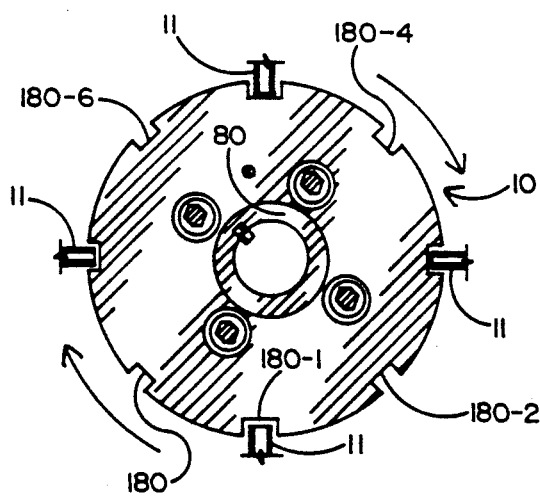
Figure 24:
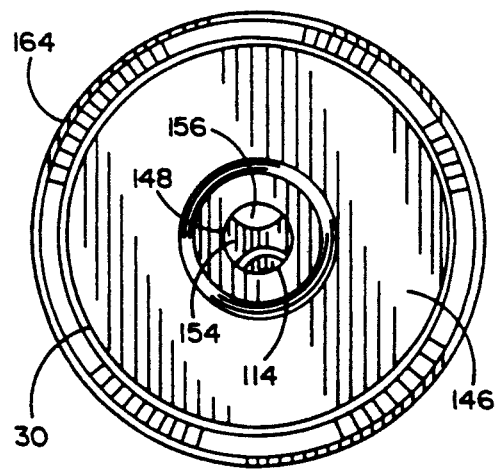

The spindle 134 will rotate in a counter-clockwise direction to cause planetary gear 154 to rotate around ring gear 162 when gear 154 is assembled as shown in FIG. 23 looking from the bottom of planetary gear cassette 30. That is, if a reference line 155 were taken through the center of planetary gear 154 (corresponding to the location of a spindle drive pin 142 therein) and the tooth of gear 154 which cooperates with the teeth of ring gear 162, three of the five clearance holes 156 will lie below such reference line. If the gear 154 were positioned in FIG. 23 such that three of the five clearance holes 156 would otherwise lie above the line 155, then spindle 134 would rotate in a clockwise direction when looking from the bottom of gear cassette 30.

In FIGS. 25 and 26, a further rotation of the spindle 134 is imparted from drive pins 142 to the planetary gear 154 and the crescent-shaped disc 158 during the dynamic condition of the insertion tool when an impact force is applied to the cam enclosure (not shown) such that said cam enclosure moves towards the bottom of its downstroke and the cam follower pins 11 are correspondingly moved to respective lower tracks (e.g. 182 of FIG. 19) in each of the branches of the guide track system 50 to rotate cam 10, in the manner previously described. Thus, the planetary gear 154 rotates 22.5 degrees (from the at rest position of FIG. 23) within or inside the ring gear 162, whereby one of the nut receiving clearance holes 156 in gear 154 is aligned above the exit opening 148 through nose cone 146. Accordingly, in the dynamic condition of FIGS. 25 and 26, the insertion tool 1 is moved downwardly by the punch press, such that planetary gear cassette 30 is moved into contact with the sheet metal workpiece 172 (best shown in FIG. 30), and the captive nut 114 that is located in a clearance hole 156 and axially aligned with the exit opening 148 and a hole 174 in workpiece 172 is now positioned to be engaged by the punch assembly 60 and forcibly ejected through exit opening 148 and into the hole 174 (best shown in FIG. 31) at the bottom of the downstroke of the cam enclosure.

In FIGS. 27 and 28, a still further rotation of the spindle 134 is imparted from drive pins 142 thereof to the planetary gear 154 and the crescent-shaped disc 158 when the impact force applied to the cam enclosure (not shown) during the dynamic condition has been terminated and the insertion tool returns to the at rest condition. Therefore, cam follower pins 11 correspondingly move back to respective upper tracks (180-1, 180-3, 180-5 and 180-7 of FIGS. 21 and 22) in successive branches of the guide track system 50 so as to continue to rotate the cam 10. Moreover, the planetary gear 154 has now rotated a total of 45 degrees (from the previous at rest position of FIG. 23) around the ring gear 162, whereby each of the nut receiving clearance holes 156 in gear 154 is once again rotated out of alignment with the exit opening 158 through nose cone 146. Thus, as described when referring to FIGS. 23 and 24, in the at rest condition of FIGS. 27 and 28, the planetary gear cassette 30 will be spaced above the sheet metal workpiece 172 (like that shown in FIG. 29), and none of the captive nuts 114 that are located in said clearance holes 156 can either fall out or be forcibly ejected through exit opening 148.

It should be apparent that each time the reciprocating cam enclosure (designated 2 in FIG. 7) is moved downwardly and to the bottom of its downstroke in response to an impact force being applied thereto during the dynamic condition of the insertion tool, one of the nut clearance holes 156 in planetary gear 154 in which a captive nut 114 is located is positioned above and in alignment with the exit opening 148. What is more, and as will now be disclosed when referring to FIGS. 29-31 of the drawings, the impact force that is directed to the cam enclosure from the punch press during the dynamic condition will also move the insertion tool downwardly and into contact with a sheet metal workpiece 172. The impact force then drives the punch assembly 60 downwardly through the spindle 134, whereby to engage and forcibly eject the nut 114 from its clearance hole 156 and into the hole 174 in workpiece 172 via the exit opening 148 in nose cone 146.

FIG. 29 shows the nose cone 146 of the insertion tool 1 spaced above a sheet metal workpiece 172 with tool 1 in the at rest condition and an impact force being applied from the punch press to the lock nut (22) of the reciprocating cam enclosure (not shown). Captive nuts 114 are shown stacked on guide rods 110 to be loaded, under the influence of gravity, one at a time, from successive rods 110 into respective clearance holes 156 of the rotating planetary gear 154. As was previously disclosed when referring to FIGS. 23 and 24, in the at rest condition, the drive pins 142 extending from the head 144 of spindle 134 position the planetary gear 154 and the crescent-shaped disc 158, such that none of the clearance holes 156 in which captive nuts 114 are located is aligned with the exit opening 148 in nose cone 146. To this end, the punch assembly (not shown) is displaced upwardly from planetary gear cassette 30.

Figure 30:
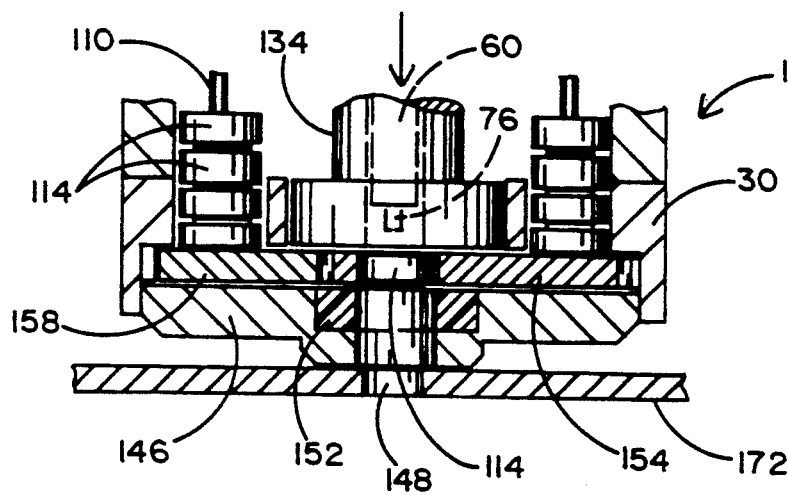

FIG. 30 shows the nose cone 146 moved with the insertion tool 1 downwardly and into contact with the workpiece 172 at the beginning of the dynamic condition of tool 1 with an impact force being applied to the lock nut (22) of the reciprocating cam enclosure (not shown) to initiate the downstroke. That is, the striker of the press first moves the insertion tool 1 downwardly towards a hole 174 in workpiece 172 so that the exit opening 148 in nose cone 146 is disposed above said hole. As was previously described when referring to FIGS. 25 and 26, the planetary gear 154 is positioned (i.e. rotated) so that one clearance hole 156 in which a captive nut 114 is located is aligned with the exit opening 148. The urethane liner 152 of nose cone 146 prevents nut 114 from falling through opening 148 under the influence of gravity. The striker of the punch press then moves the cam enclosure (against the bias of springs 12 and 14 of FIG. 14), whereby the punch assembly 60 is driven downwardly through spindle 134 to cause the punch 76 to be correspondingly moved towards said nut 114.

Figure 31:
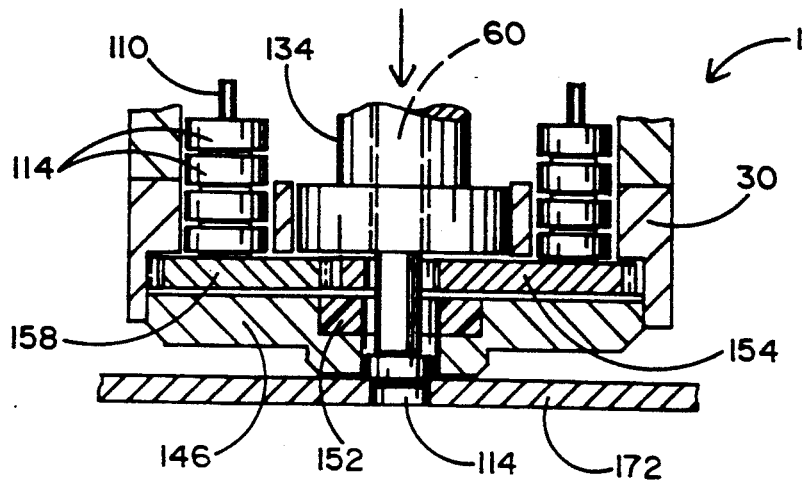
Figure 32:
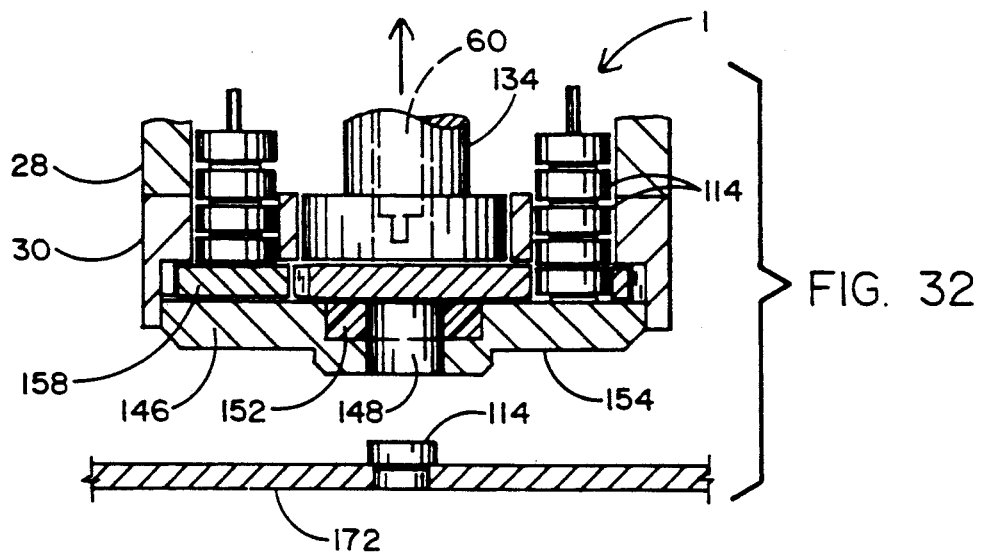

FIG. 31 shows the punch assembly 60 moved downwardly and completely through the spindle 134 at the bottom of the downstroke of the cam enclosure (not shown) to cause the captive nut 114 to be forcibly ejected through the urethane liner 152 and the exit opening 148 in nose cone 146 for receipt within the hole 174 of workpiece 172. FIG. 32 shows the punch assembly 60 moving upwardly through the spindle 134 when the cam enclosure (not shown) begins its upstroke and insertion tool 1 returns to the at rest condition (under the normal bias of springs 12 and 14 of FIG. 14). Likewise, the tool 1 and nose cone 146 are moved upwardly and away from the workpiece 172 after the captive nut 114 has been inserted therein. As was previously described when referring to FIGS. 27 and 28, the planetary gear 154 is positioned (i.e. rotated) so that all of the clearance holes 156 in gear 154 are moved out of alignment with the exit opening 148 through nose cone 146 until the start of the next downstroke of the cam enclosure in response to another impact force applied thereto from the punch press.

Figure 33:
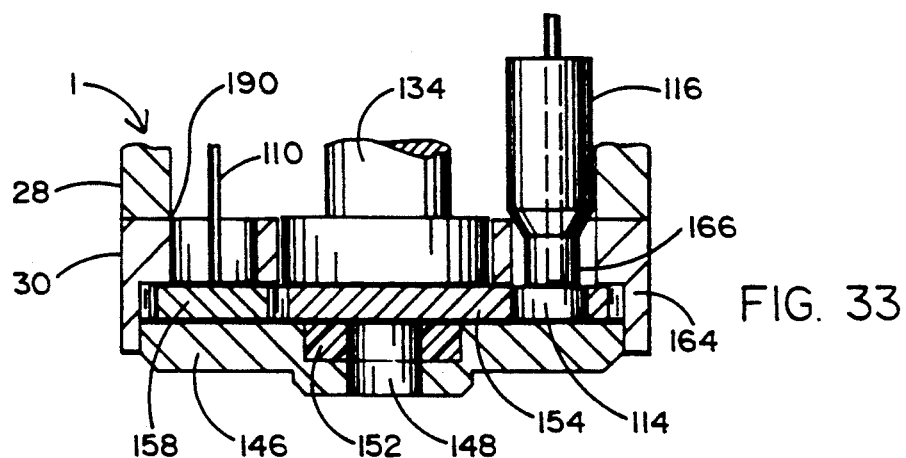
FIG. 33 is a partial cross-section of the planetary gear cassette with the last of the captive nuts to be ejected therefrom.

FIG. 33 of the drawings shows the planetary gear cassette 30 after all of the captive nuts stored in the canister assembly on guide rods 110 have been loaded (by gravity) into the clearance holes 156 of planetary gear 154 and forcibly ejected via the exit opening 148 in nose cone 146. More particularly, the end of canister end cap 28 adjacent cassette 30 includes radially projecting shoulders 190 which extend from cap 28 over a portion of each of the holes 166 through the gear housing 164 of cassette 30 (also shown in FIG. 12). Radially projecting shoulders 190 are of particular length so as not to impede the passage of captive nuts 114 through holes 166 but to otherwise catch the weights 116 that slide down guide rods 110 after the nuts 114 have all been dispensed therefrom. Accordingly, the downward movement of weights 116, under gravity, will be blocked, such that the progress of said weights will be limited to an area of the planetary gear cassette 30 above the clearance holes 156 in planetary gear 154.

Figure 34:
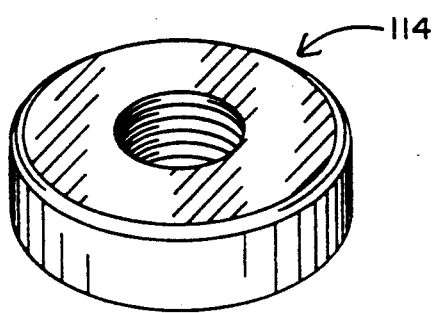
FIG. 34 is a top perspective view of a captive nut which is stored in and installed by the insertion tool of the present invention.
Figure 35:
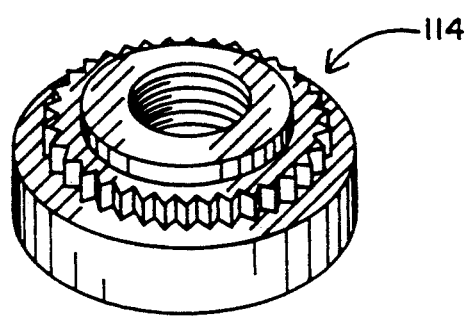
FIG. 35 is a bottom perspective view of the captive nut of FIG. 34.
Figure 36:
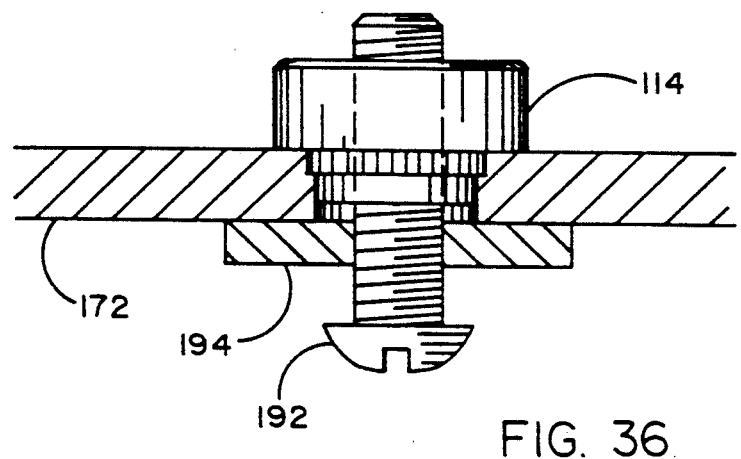
FIG. 36 shows the captive nut of FIGS. 34 and 35 installed in a hole through a sheet metal workpiece and receiving a complimentary bolt therethrough.

FIGS. 34 and 35 of the drawings show the top and bottom, respectively, of a conventional captive or clinch nut 114 which is stored within the insertion tool 1 of this invention and ejected into a hole in a sheet metal workpiece 172. FIG. 36 shows the workpiece 172 after the captive nut 114 has been inserted, so that a complimentary fastener (e.g. screw 192) can be mated to nut 114 for securing workpiece 172 to an adjacent piece 194.

Figure 37:
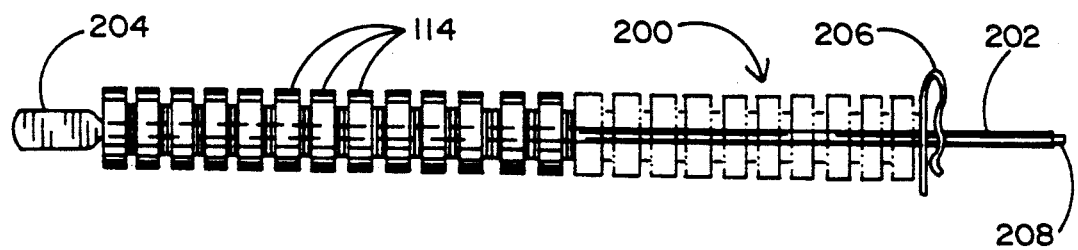
FIG. 37 shows a captive nut carrier and dispenser which forms another embodiment of this invention.

FIG. 37 shows a nut carrier and dispenser 200 which forms an additional embodiment of the present invention. The nut carrier and dispenser 200 is particularly adapted for use with the captive nut insertion tool 1 which forms the present invention, in that said carrier and dispenser 200 carries a plurality of the same captive nuts 114 which are stored within the canister assembly 4 of tool 1. More particularly, nut carrier 200 includes an elongated shaft 202 which is sized to fit through a plurality of nuts 114 stacked one atop the other. Shaft 202 has an enlarged head 204 affixed at one end thereof and a removable clip or pin 206 extending through a hole in the opposite end. The head 204 and clip 206 form barriers to prevent the inadvertent removal of the nuts 114 from opposite ends of the shaft 202. As an important advantage of nut carrier 200, the end of shaft 202 opposite head 204 is provided with a narrow loading tip 208.

Figure 38:
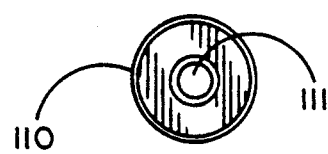
FIG. 38 is an end view of a nut carrying guide rod of FIG. 11 adapted to be interconnected with a loading tip of the nut carrier and dispenser of FIG. 37.

The advantage of nut carrier 200 is now described while referring concurrently to FIGS. 11, 37 and 38 of the drawings. The end of each nut carrying guide rod 110 which extends through a guide chamber 118 of canister body 26 includes a receptacle 111 (best shown in FIG. 37) at the end thereof which is opposite head 112. The receptacle 111 is sized to receive the loading tip 208 of nut carrier 200 when such nut carrier 200 and guide rod 110 are aligned end-to-end one another. Accordingly, guide rods 110 may be easily loaded with a fresh supply of captive nuts 114 once the supply of nuts stored within canister body 26 has been exhausted. That is, by inserting a nut carrier 200 (with clip 206 removed therefrom) through an exit hole 120 in canister end cap 28 (best shown in FIG. 11), carrier 200 and guide rod 110 may be axially aligned with one another when the loading tip 208 of carrier 200 is received in the receptacle 111 of rod 110. Hence, a supply of captive nuts 114 may be easily dispensed from a nut carrier 200 and transferred to a nut carrying guide rod 110 without having to remove said guide rod from the canister body 26. Moreover, the nuts 114 will be conveniently stored in a pre-stacked alignment on carrier 200 so as to be efficiently loaded onto guide rod 110, as opposed to having to load said nuts one at a time from a loose supply thereof.

It will be apparent that while a preferred embodiment of the invention has been shown and described, various modifications and changes may be made without departing from the true spirit and scope of the invention. For example, while the insertion tool 1 of this invention has been described as having particular application for storing and inserting captive or clinch nuts 114, it is to be understood that this invention is not to be regarded as so limited, and other suitable fasteners may be stored in and ejected from said tool, in the manner described herein.

We claim:

1. A tool for inserting fasteners into holes formed in a workpiece, and comprising:
    canister assembly means for storing a plurality of such fasteners to be inserted, said canister assembly means including an exit opening and means for positioning particular ones of said fasteners in axial alignment with said exit opening to be ejected therethrough and into a hole in the workpiece;
    impact receiving means movable relative to said canister assembly means in response to the application of a force thereto;
    punch assembly means interconnected with said impact receiving means, said punch assembly means extending through said canister assembly means and being moved into the exit opening thereof when said impact receiving means is moved towards said canister assembly means; and
    motion translating means interconnected between said impact receiving means and said canister assembly means, such that the movement of said impact receiving means is transferred by said motion translating means to the positioning means of said canister assembly means to cause said positioning means to position one of said fasteners in alignment with said exit opening to be ejected therethrough when said punch assembly means is moved into said exit opening.

2. The insertion tool recited in claim 1, wherein said impact receiving means is located in spaced alignment with said canister assembly means when said impact receiving means is at rest, said impact receiving means being moved towards said canister assembly means in response to the application of a force thereto for correspondingly causing said punch assembly means to be moved into the exit opening of said canister assembly means.

3. The insertion tool recited in claim 2, further comprising spring means interfaced with said impact receiving means and having expanded and compressed states, said spring means being normally expanded for biasing said impact receiving means to said spaced alignment with said canister assembly means when said impact receiving means is at rest, said spring means being compressed when said impact receiving means is moved towards said canister assembly means in response to the application of a force thereto, and said spring means expanding for returning said impact receiving means to said spaced alignment and correspondingly causing said punch assembly means to be withdrawn from said exit opening when the force applied to said impact receiving means is terminated.

4. The insertion tool recited in claim 2, wherein said motion translating means includes a rotatable cam interconnected between said impact receiving means and the positioning means of said canister assembly means, the movement of said impact receiving means towards said canister assembly means being transferred to said cam to rotate said cam, which rotation causes said positioning means to position said one fastener in alignment with said exit opening to be ejected therethrough by said punch assembly means.

5. The insertion tool recited in claim 4, wherein said cam includes a guide track system extending around the periphery thereof and said impact receiving means includes at least one pin extending therefrom for receipt in said guide track system, said pin traveling through said guide track system for converting the movement of said impact receiving means towards said canister assembly means into the rotation of said cam.

6. The insertion tool recited in claim 5, wherein the guide track system of said cam includes at least one upper track, at least one lower track and an intermediate track extending therebetween, the pin of said impact receiving means traveling from said upper track to said lower track via said intermediate track for causing the rotation of said cam when said impact receiving means moves towards said canister assembly means.

7. The insertion tool recited in claim 6, wherein the upper and lower tracks of said track system are arranged in spaced, parallel alignment with one another and said intermediate track is angled therebetween, the movement of said impact receiving means causing the rotation of said cam when the pin of said impact receiving means is received in and travels through said angled intermediate track.

8. The insertion tool recited in claim 5, further comprising a housing and a flange from which said housing extends, said flange being located between said impact receiving means and said canister assembly means and said cam being supported at and rotatable around said housing, said cam being spaced from said impact receiving means when said impact receiving means is at rest.

9. The insertion tool recited in claim 8, wherein the interior of said impact receiving means is hollow, said cam being received within said hollow interior when said impact receiving means moves towards said canister assembly means in response to a force being applied thereto for causing the pin of said impact receiving means to travel through the guide track system of said cam to thereby rotate said cam.

10. The insertion tool recited in claim 4, said motion translating means further including a rotatable spindle interconnected between said cam and the positioning means of said canister assembly means, the rotation of said cam being transferred to said spindle to rotate said spindle, said spindle rotation causing said positioning means to position said one fastener in axial alignment with said exit opening to be ejected therethrough by said punch assembly means.

11. The insertion tool recited in claim 10, wherein said spindle surrounds said punch assembly means and extends in coaxial alignment therewith through said canister assembly means, such that said spindle rotates around said punch assembly means and said punch assembly means moves through said spindle and towards the exit opening of said canister assembly means when said impact receiving means moves towards said canister assembly means.

12. The insertion tool recited in claim 10, further comprising a rotatable hub assembly interconnected between said cam and said spindle, such that the rotation of said cam is transferred to said hub assembly to rotate said hub assembly, said hub assembly rotation causing said spindle to rotate.

13. The insertion tool recited in claim 10, wherein the positioning means of said canister assembly means includes a rotatable planetary gear having at least one hole formed therein in which said one fastener to be inserted is received, the rotation of said spindle being transferred to said planetary gear to rotate said gear relative to the exit opening of said canister assembly means, said planetary gear rotation causing said one fastener to be positioned in axial alignment with said exit opening to be ejected therethrough by said punch assembly means.

14. The insertion tool recited in claim 13, wherein said fasteners to be inserted are nuts, said tool further comprising at least one elongated guide rod extending through said canister assembly means and having said nuts stacked thereon, said guide rod being aligned with said planetary gear, such that successive ones of said stacked nuts are received by the hole in said planetary gear from said guide rod for ejection through said exit opening as said gear rotates relative to said exit opening.

15. The insertion tool recited in claim 14, further comprising nut carrying and dispensing means having an elongated shaft on which a plurality of said nuts are stacked and having a relatively narrow dispensing tip, said guide rod which extends through said canister assembly means having a receptacle formed at one end thereof in which to receive the dispensing tip of the shaft of said nut carrying and dispensing means, such that said shaft and said rod will be axially aligned with one another to permit the transfer of nuts therebetween.

16. The insertion tool recited in claim 1, further comprising a liner surrounding the exit opening of said canister assembly means to engage and prevent said one fastener that is aligned with said exit opening from accidentally falling out prior to being ejected therethrough by said punch assembly means.

17. A tool for inserting fasteners into a structure to be fastened, and comprising:

canister assembly means for storing a plurality of such fasteners to be inserted, said canister assembly means including an exit opening and rotatable positioning means for positioning successive ones of said fasteners in axial alignment with said exit opening to be ejected therethrough and into the structure to be fastened;

punch assembly means extending through said canister assembly means and being movable into the exit opening thereof to eject one of said fasteners that is aligned with said opening;

impact receiving means interconnected with each of the positioning means of said canister assembly means and said punch assembly means, said impact receiving means adapted for reciprocal movement towards said canister assembly means in response to the application of a force thereto and away from said canister assembly means when said applied force is terminated; and motion translating means coupled between said impact receiving means and the rotatable positioning means of said canister assembly means, such that the reciprocal movement of said impact receiving means relative to said canister assembly means simultaneously causes said positioning means to rotate relative to said exit opening and said punch assembly means to move into and out of said exit opening for ejecting therethrough said one fastener that is aligned with said opening.

18. The insertion tool recited in claim 17, further comprising spring means interfaced with said impact receiving means and having expanded and compressed states, said spring means being normally expanded for biasing said impact receiving means so as to be in spaced alignment with said canister assembly means when said impact receiving means is at rest, said spring means being compressed when said impact receiving means is moved towards said canister assembly means in response to the application of a force thereto, and said spring means expanding for returning said impact receiving means to said spaced alignment when said force applied to said impact receiving means is terminated.

19. The insertion tool recited in claim 17, wherein said motion translating means includes a rotatable cam interconnected between said impact receiving means and the positioning means of said canister assembly means, the reciprocal movement of said impact receiving means being transferred to said cam to rotate said cam, which rotation causes said rotatable positioning means to rotate said one fastener to be ejected into alignment with said exit opening to be ejected therethrough by said punch assembly means.

20. The insertion tool recited in claim 19, wherein said cam includes a guide track system extending around the periphery thereof and said impact receiving means includes at least one pin extending therefrom for receipt in said guide track system, said pin traveling through said guide track system for converting the reciprocal movement of said impact receiving means relative to said canister assembly means into the rotation of said cam.

21. The insertion tool recited in claim 20, said motion translating means further including a rotatable spindle interconnected between said cam and the rotatable positioning means of said canister assembly means, the rotation of said cam being transferred to said spindle to rotate said spindle, said spindle rotation causing said positioning means to rotate said one fastener into axial alignment with said exit opening to be ejected therethrough by said punch assembly means.

22. The insertion tool recited in claim 21, wherein said spindle surrounds said punch assembly means and extends in coaxial alignment therewith through said canister assembly means, such that said spindle rotates around said punch assembly means and said punch assembly means moves through said spindle and towards the exit opening of said canister assembly means when said impact receiving means moves towards said canister assembly means.

23. The insertion tool recited in claim 21, wherein the rotatable positioning means of said canister assembly means includes a planetary gear having at least one hole formed therein in which said one fastener to be inserted is received, the rotation of said spindle being transferred to said planetary gear to rotate said gear relative to the exit opening of said canister assembly means, said planetary gear rotation causing said one fastener to be positioned in axial alignment with said exit opening to be ejected therethrough by said punch assembly means.

24. The insertion tool recited in claim 23, wherein said fasteners to be inserted are nuts, said tool further comprising at least one elongated guide rod extending through said canister assembly means and having said nuts stacked thereon, said guide rod being aligned with said planetary gear, such that successive ones of said stacked nuts are received by the hole in said planetary gear for alignment with said exit opening to be ejected therethrough as said gear rotates relative to said exit opening.

25. A tool for inserting nuts into holes in a workpiece, and comprising:

canister assembly means for storing a plurality of such nuts to be inserted, said canister assembly means including an exit opening and a rotatable planetary gear having holes formed therein for receiving and positioning said nuts, one at a time, in axial alignment with said exit opening to be ejected therethrough and into a hole in the workpiece;

a plurality of guide rods extending through said canister assembly means and having said nuts stacked thereon, said guide rods being aligned with said planetary gear so that the first of said nuts on each of said guide rods is received in a respective hole in said planetary gear;

punch assembly means extending through said canister assembly means and being movable into the exit opening thereof to eject one of said nuts that is aligned with said opening;

impact receiving means connected to said punch assembly means and adapted for reciprocal movement towards said canister assembly means in response to the application of a force thereto to move said punch assembly means into said exit opening and away from said canister assembly means when said applied force is terminated to move said punch assembly means out of said exit opening;

rotatable cam means coupled to said impact receiving means, such that the reciprocal movement of said impact receiving means causes said cam means to rotate; and rotatable spindle means extending through said canister assembly means and connected between said cam means and the planetary gear of said canister assembly means, such that the rotation of said cam means is transferred to said spindle means to cause said spindle means to rotate which rotation, in turn, is transferred to said planetary gear to cause said planetary gear to rotate relative to said exit opening and thereby position successive ones of said nuts in alignment therewith.

* * * * *